United States Patent [19]
Takaba et al.

[11] Patent Number: 5,841,983
[45] Date of Patent: Nov. 24, 1998

[54] COMMUNICATION SYSTEM FOR TRANSMITTING DIVISIONAL MESSAGES BACK-TO-BACK BY PRE-SETTING BLANK DURATION BETWEEN THE DIVISONAL MESSAGES PRIOR TO TRANSMISSION

[75] Inventors: Katsumi Takaba, Obu; Masahito Hyodo, Anjou; Takahide Abe, Kariya, all of Japan

[73] Assignee: Nippondenso Co., Ltd., Kariya, Japan

[21] Appl. No.: 582,429

[22] Filed: Jan. 3, 1996

[30] Foreign Application Priority Data

Jan. 18, 1995 [JP] Japan ................................. 7-005416
Feb. 16, 1995 [JP] Japan ................................. 7-028255
Oct. 12, 1995 [JP] Japan ................................. 7-264391

[51] Int. Cl.⁶ .................................................. H04J 3/14
[52] U.S. Cl. ............................ 395/200.55; 395/200.52; 395/830; 395/849; 395/860; 395/878; 701/36
[58] Field of Search .................................... 395/856, 860, 395/863, 183.01, 732, 878, 830, 849, 200.38, 200.55, 200.52; 370/445, 447, 448; 340/825.51; 364/424.03; 324/402; 701/36

[56] References Cited

U.S. PATENT DOCUMENTS

| 4,547,850 | 10/1985 | Genma | 395/200.06 |
| 4,561,092 | 12/1985 | Shaver | 370/448 |
| 5,349,690 | 9/1994 | Frame et al. | 395/800 |
| 5,485,147 | 1/1996 | Jaffe et al. | 370/445 |
| 5,526,355 | 6/1996 | Yang et al. | 370/448 |

FOREIGN PATENT DOCUMENTS 4-032333 2/1992 Japan .
6-129949 5/1994 Japan .

OTHER PUBLICATIONS

Road Vehicles—Diagnostic systems—part 2, ISO International Standard, ISO 9141-2 1994.

*Primary Examiner*—Dinh C. Dung
*Attorney, Agent, or Firm*—Cushman Darby & Cushman IP Group of Pillsbury Madison & Sutro LLP

[57] ABSTRACT

In a communication system which ensures that a slave device can successively transmit a plurality of answer messages without causing collision with another message on a communication line, in response to a request message from a diagnosis tester, control devices transmit their answer messages in the order of their priorities, with a communication blank duration provided between answer messages. If any one of the control devices has first and second answer message to be transmitted successively, the control device transmits the second answer message a communication blank duration after completing transmission of the first answer message. The control device can thereby transmit the first and second answer messages before a control device of a lower priority starts to transmit its answer message. Message collision on the communication line is thus avoided.

23 Claims, 23 Drawing Sheets

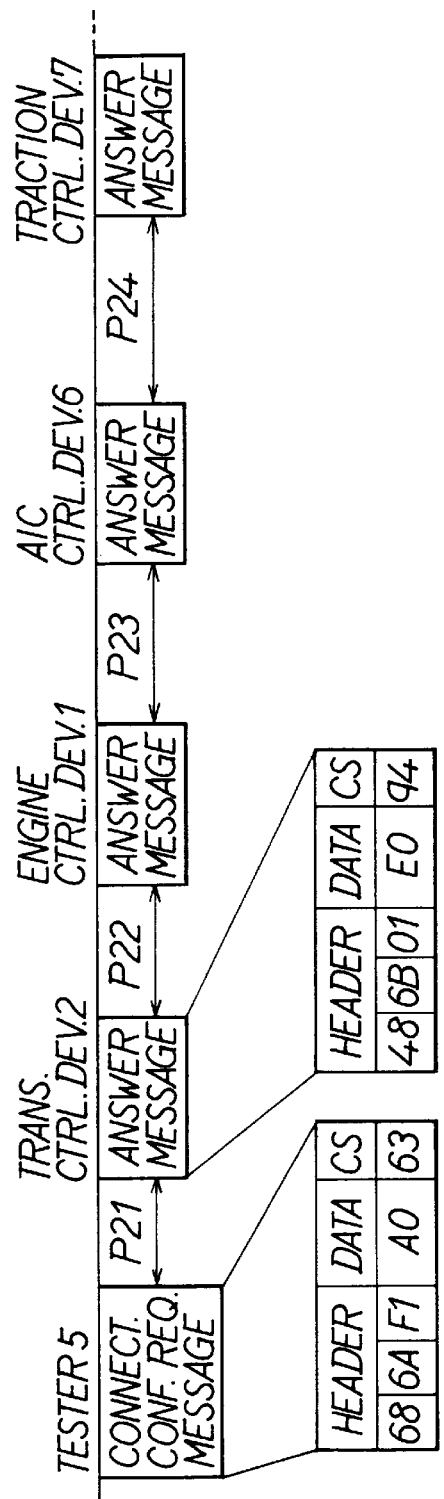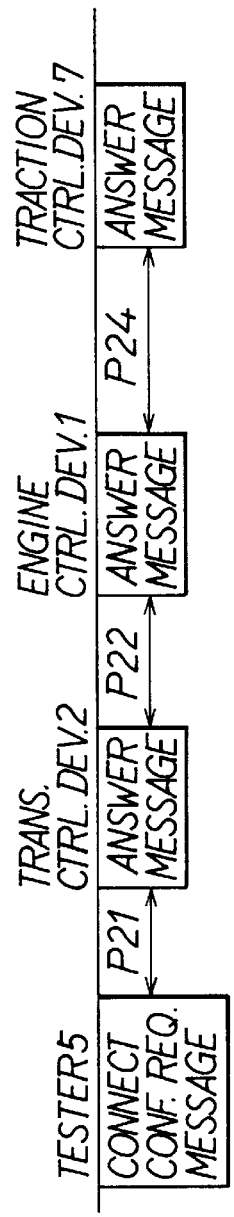
FIG. 2A
FIG. 2B
FIG. 2C

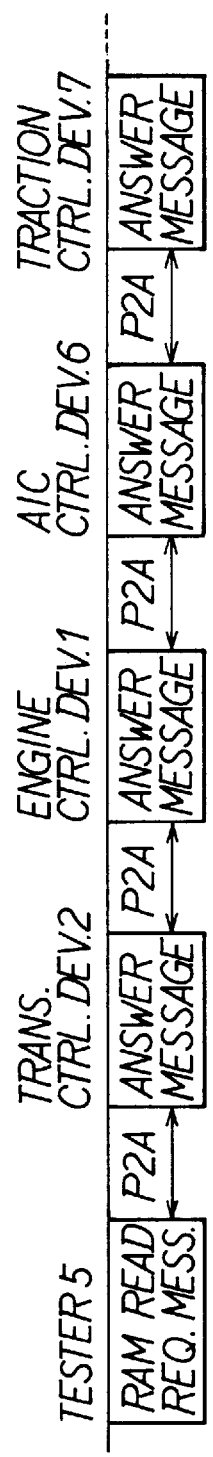
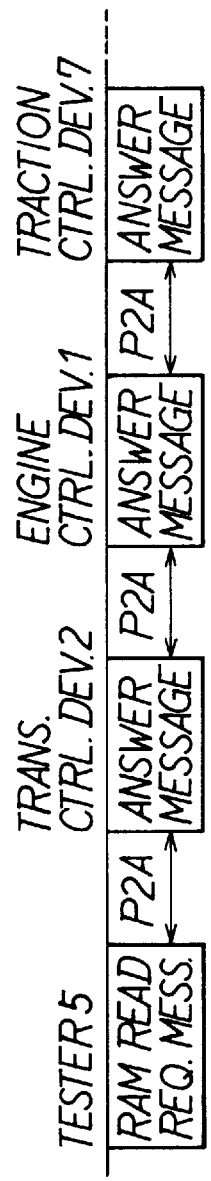
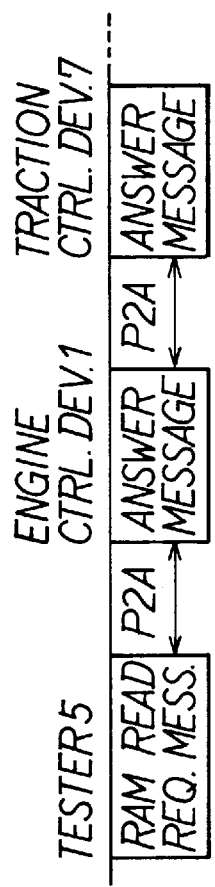
FIG. 3A
FIG. 3B
FIG. 3C

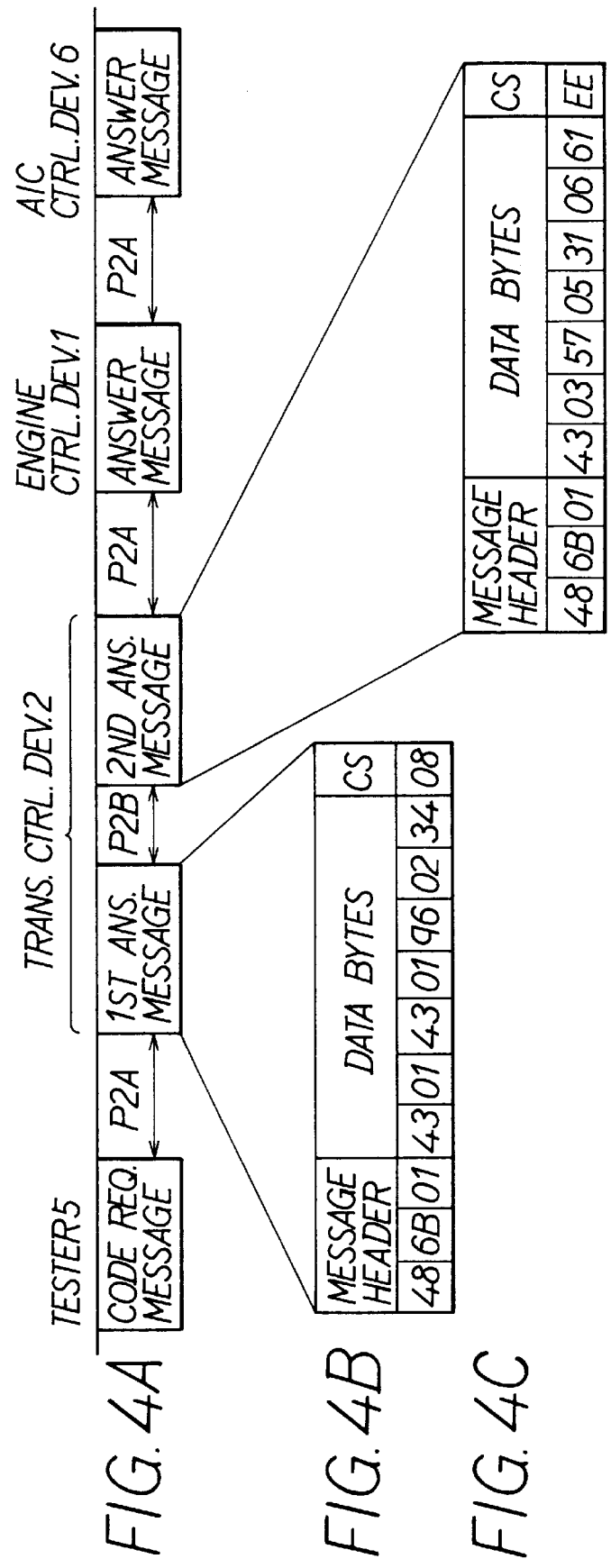

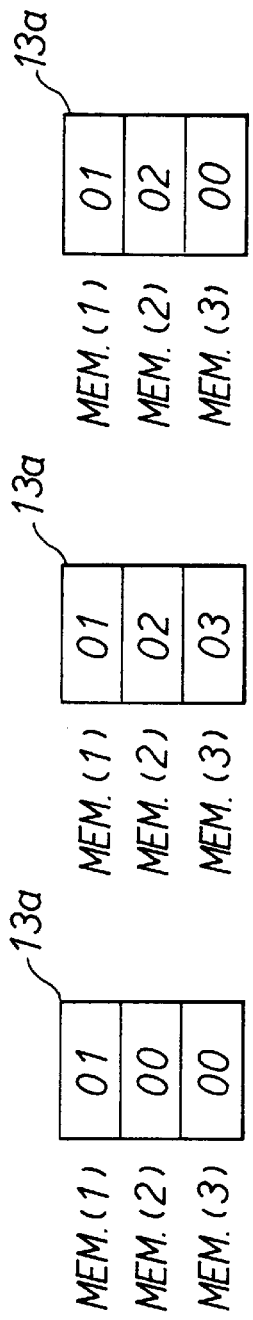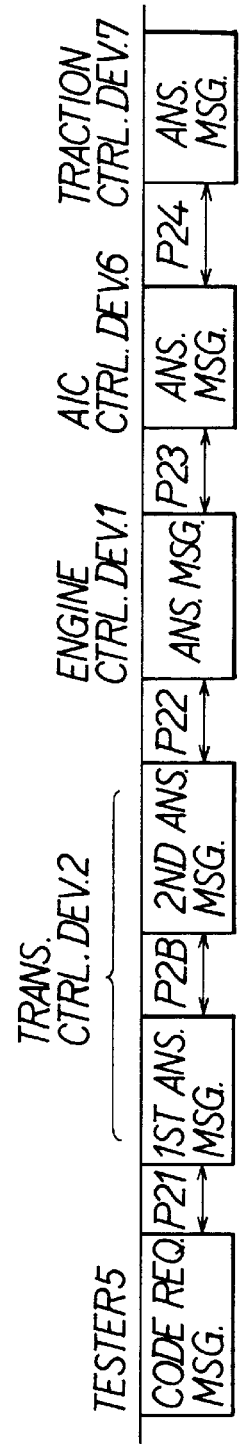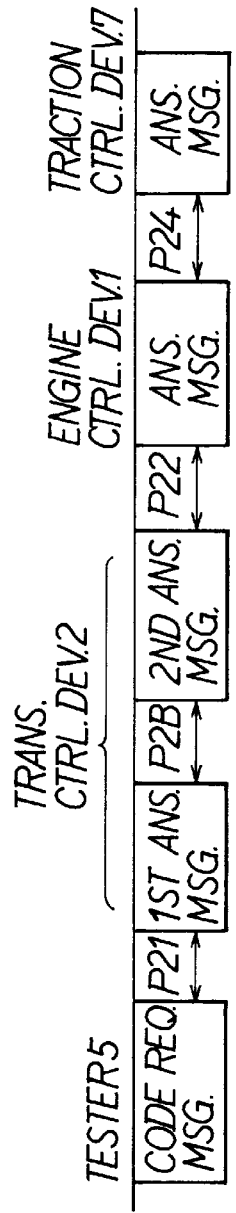

FIG. 18A  CONNECTION ECU MEM 13a    P2n SETTING TABLE

FIG. 18B  CONNECTION ECU MEM 13a    P2n SETTING TABLE

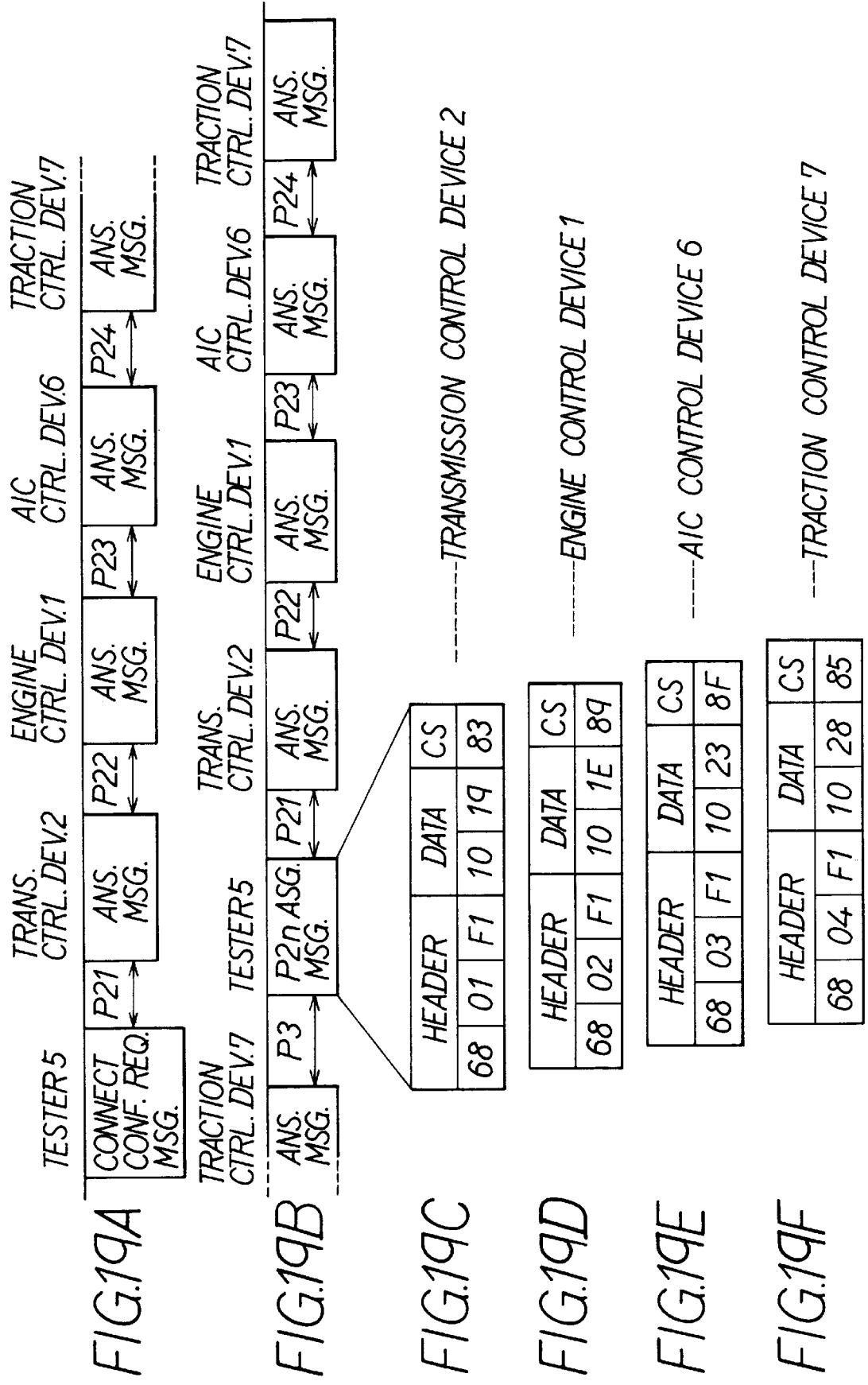

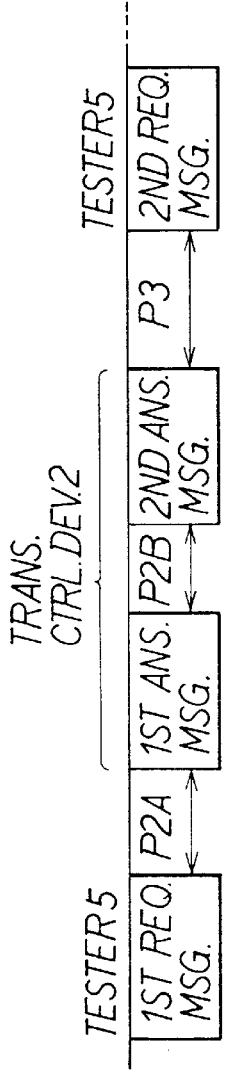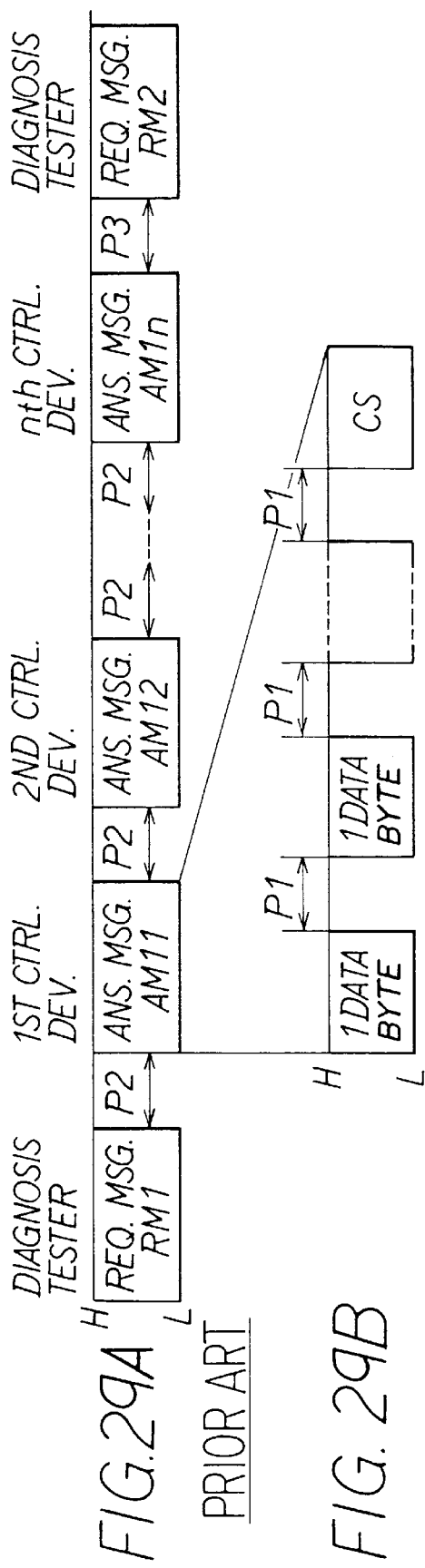
FIG. 27
FIG. 28
FIG. 29A PRIOR ART
FIG. 29B

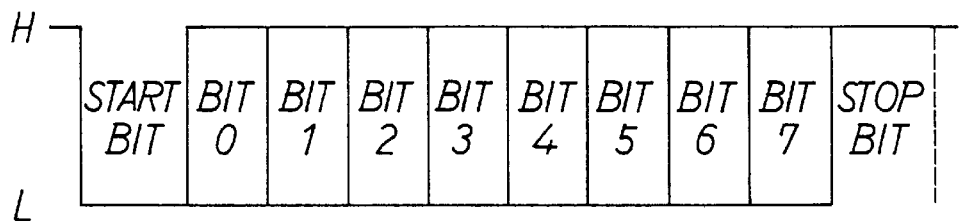
FIG. 30 PRIOR ART
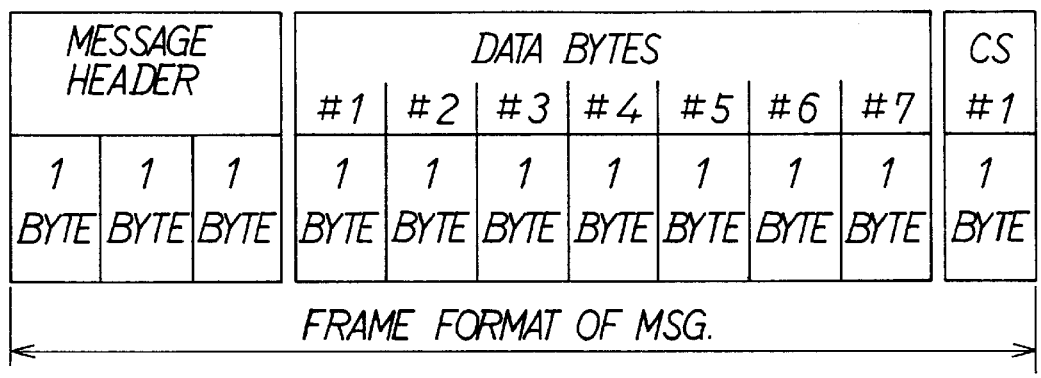
FIG. 31 PRIOR ART
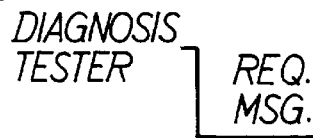
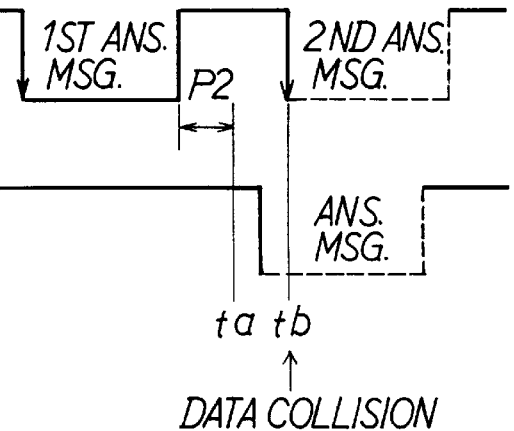
FIG. 32C
PRIOR ART

5,841,983

COMMUNICATION SYSTEM FOR TRANSMITTING DIVISIONAL MESSAGES BACK-TO-BACK BY PRE-SETTING BLANK DURATION BETWEEN THE DIVISONAL MESSAGES PRIOR TO TRANSMISSION

CROSS-REFERENCE TO RELATED APPLICATIONS

This application is related to and claims priority from Japanese Patent Application Nos. Hei. 7-5416, 7-28255, and 7-264391, incorporated herein by reference.

BACKGROUND OF THE INVENTION

1. Field of the Invention

The present invention relates to a communication system for exchanging data between a slave device, such as a transmission control device of a vehicle, and a master device, such as an external tester, that is remotely connected to the slave device. The invention also relates to a slave device used in the communication system.

2. Description of Related Art

Electronic control devices using microcomputers are increasingly employed in various automotive apparatuses, for example, the engine or the transmission. This trend in automotive engineering has dramatically improved the controllability of such apparatuses installed in vehicles. However, it also has led to complication of diagnosis of the apparatuses.

To ease the complication of diagnosis, various measures have been taken. For example, automotive electronic control devices are provided with self-diagnosis functions so that the devices control their object automotive apparatus and diagnose the apparatuses and themselves. In addition, the following diagnostic systems have been developed:

(a) a system in which electronic control devices (i.e., slave devices) installed in a vehicle are connected to an external so-called diagnosis tester (i.e., a master device) that assists sophisticated diagnosis and analysis of diagnostic data; and (b) a system in which one of the electronic control devices installed in a vehicle is provided as a master device and the others are provided as slave devices communicatively connected to the master device, so that the slave devices are diagnosed centrally through the master device.

When a diagnosis tester is used to diagnosis an automotive system or apparatus as in the diagnostic system (a), the communication between the diagnosis tester and the vehicle-installed electronic control devices normally employs a communication protocol according to an international standard ISO-9141-2. This communication protocol will be described below with reference to FIGS. 29A and 29B, in which H indicates a logical high level and L indicates a logical low level.

Data is exchanged between the diagnosis tester and electronic control devices as follows.

Step 1: The diagnosis tester transmits a diagnosis request message RM1 to the first through nth electronic control devices.

Step 2: The first electronic control device, having the highest priority, starts preparing a response to the diagnosis request message RM1.

Step 3: The first device transmits an answer message AM11 to the diagnosis tester in response to the request message RM1.

Step 4: The second device, having the second highest priority, is temporarily released from synchronization to prepare a response to the request message RM1 in order to ensure that the first device completes responding.

Step 5: The second device transmits an answer message AM12 to the diagnosis tester in response to the request message RM1.

Step 6: The procedure of Steps 2 and 3 or Steps 4 and 5 is repeated for the other electronic control devices in the order of descending priorities until the nth device transmits an answer message AM1n.

Step 7: The diagnosis tester is temporarily released from synchronization to start preparing to transmit a next diagnosis request message RM2 in order to ensure that the devices complete responding.

Step 8: The diagnosis tester transmits the request message RM2 to the first through nth devices.

The first through nth electronic control devices, that is, slave devices, are assigned with priorities to determine the order in which the devices transmit answer messages as described above. Thus, the second device, for example, transmits an answer message only after it confirms that the first device, having a higher priority than the second device, completes transmitting the answer message.

This protocol prevents data collision on a communication line and data destruction.

Each data byte of a message comprises by 8 bits of NRZ (nonreturn to zero) coded bits as indicated in FIG. 30. Each byte is provided with a leading start bit of a logical low level and a trailing stop bit of a logical high level for recognition thereof.

The aforementioned international standard dictates that the communication blank duration P1 on the communication line indicated in FIG. 29B, that is, the time interval between the trailing edge of the stop bit of a data byte of a message and the leading edge of the start bit of the next data byte in the same message, be within a range of 0 to 20 ms (denoted herein by P1). According to the standard, the leading edge of the start bit of the next byte should come within 20 ms following completion of the reception of the stop bit of the current byte.

The international standard also determines that the communication blank duration P2 indicated in FIG. 29A, that is, the time interval between the trailing edge of the stop bit of the check sum byte (hereinafter, referred to as "CS") of a message and the leading edge of the start bit of the next message, be within a range of 0–50 ms or 25–50 ms, and that the interval P2 be greater than the interval P1 (P2>P1). Accordingly, the leading edge of the start bit of the next message should come within 50 ms following completion of the reception of the stop bit of the CS of the current message from a given electronic control device.

The maximum number of bytes that can be transmitted in the form of a single message is limited to eleven as indicated in FIG. 31, according to the E/E diagnosis test mode recommended protocol J1979 by the Society of Automotive Engineers (SAE). More specifically, the maximum number includes three bytes for a message header, seven bytes for data (#1–#7), and one byte for CS.

A limitation on the number of bytes in a message is required for the following reason. A message receiver is incapable of processing data received in real time because of the limited processing speed of the program of the microcomputer used and, therefore, the receiver needs to temporarily store the data in a buffer. Since the storage capacity of the buffer is limited, the number of bytes in a message must be limited.

Therefore, if an electronic control device has an answer message to transmit that is longer than 11 bytes (including one byte for CS), the device needs to divide the message into divisional answer messages.

The aforementioned international standard determines that the communication blank duration P2 be provided between messages. Thus, if an answer message is divided into divisional messages, the divisional messages must be spaced from one another by the interval P2 according to the international standard.

If a first electronic control device has first and second answer messages to successively transmit in response to a request message from the diagnosis tester, the control device starts preparing to transmit the second divisional message at time ta, that is, when the interval P2 elapses after completion of transmission of the first divisional message. As a result, the start of actual transmission of the second divisional message is delayed to time tb because of the time required for processing of the microcomputer and the like.

The second device, having the second priority, starts preparing an answer message at the time ta. Because of the microcomputer's processing time and the like, the transmission starting time may come between the time ta and the time tb. If this happens, the second divisional message from the first device will collide with the message from the second device.

Such data collision by subtle timing failure does not necessarily occur, but this problem must be overcome to establish a reliable communication system.

SUMMARY OF THE INVENTION

Accordingly, it is an object of the present invention to ensure that if a slave device divides an answer message in response to a request message transmitted from a master device through a communication line, the slave device will transmit the divisional messages successively without causing a collision with another message on the communication line.

To achieve the above object, according to a first preferred embodiment of the present invention, there is provided a communication system in which if at least one slave device divides an answer message into a plurality of divisional answer messages, the slave device transmits the divisional answer messages successively so that a communication blank duration on the communication line (hereinafter, simply referred to as "communication blank duration") between the divisional answer messages equals a second predetermined length of time which is less than a first predetermined length of time (that is, a communication blank duration between answer messages from slave devices of consecutive priorities).

With this construction, the slave device successively transmits its divisional answer messages before another slave device starts to transmit its answer message. Thereby, the slave device unfailingly transmits its divisional answer messages without causing collision with an answer message from another slave device on the communication line.

Preferably, there is provided a communication line in which the first predetermined lengths of time respectively determined for the slave devices become shorter in the order of ascending priorities of the slave devices.

With this construction, after the master device has transmitted a request message, the slave device having the highest priority first transmits its answer message, and then the slave device having the second highest priority transmits its answer message. After that, the other slave devices sequentially transmit their answer messages in the order of descending priorities.

Since the slave devices transmit their messages sequentially in the order of descending priorities, a collision of answer messages from slave devices on the communication line is avoided.

According to a second preferred embodiment of the invention, there is provided a communication system in which the connection confirming message transmitting section of the master device transmits a connection confirming message, and in response to that, the first answer message section of the slave devices transmit answer messages that carry the identification values of the slave devices. The identification values in the answer messages are sequentially stored by an identification value storing unit. Based on the identification values stored in the identification storing section, a priority setting section determines current priorities of the slave devices. Request messages and answer messages are transmitted and received on the basis of the current priorities.

The identification value storing section stores the identification values of the slave devices that are currently able to transmit their answer messages to the communication line (hereinafter, this status will be referred to simply as "ready to respond" or "able to respond"). On the other hand, the identification value storing section does not store the identification values of the slave devices that are currently unable to transmit their answer messages to the communication line (hereinafter, this status will be referred to simply as "not ready to respond" or "unable to respond"), for example, a slave device that is of optional equipment and not installed, a slave device that has a functional failure, etc.

That is, the identification value storing section stores only the identification values of the slave devices that are currently able to respond. The priority setting section then determines current priorities of the slave devices excluding the slave devices that are unable to respond.

In a system having four slave devices, for example, if slave devices of first, second and fourth priorities (hereinafter, referred to as "first slave device", "second slave device", "fourth slave device") are able to respond and a device of the third priority (referred to as "third slave device") is unable to respond, the identification value storing section stores the identification values of the first, second and fourth slave devices. In this case, the priority setting section assigns the fourth slave device with the third priority.

With this construction, the current priorities of slave devices are determined by omitting the slave devices unable to respond, if any. On the basis of the current priorities, request messages and answer messages are transmitted and received in the system. Thus, all the slave devices, including slave devices of lower priorities than a slave device unable to respond, can transmit their answer messages without causing collision of messages on the communication line.

Preferably, when the master device transmits a connection confirming message to the communication line, each slave device receives the connection confirming message. Then, the first answer message transmitting section of each slave device transmits an answer message carrying the identification value of the slave device in accordance with the order of descending priorities of the slave devices. When a slave device receives via the communication line an answer message transmitted by the first answer message transmitting section of a slave device having a higher priority, an identification value writing section writes the identification value carried by the received answer message into the identification value storing section of the slave device.

For example, if the first to fourth slave devices are able to respond, the identification value storing section of the fourth slave device stores the identification values of the first to third slave devices. If the third slave device is unable to respond, only the identification values of the first and second slave devices are written into the identification value storing section of the fourth slave device.

In a communication system according to the invention, when a slave device receives a request message from the master device, a transmission timing determining section of the slave device determines whether the turn (or timing) of the slave device to transmit its answer message has come, on the basis of the identification values stored in the identification values storing section. When the transmission timing determining section determines that it is the turn of the slave device to transmit its answer message, a second answer message transmitting section transmits the answer message.

For example, if the third slave device is unable to respond and the other slave devices are able to respond, the fourth slave device determines that the third slave device is unable to respond on the basis of the fact that the identification values storing section of the fourth slave device stores only the identification values of the first and second slave devices. The fourth slave device accordingly determines its current priority as third.

The fourth slave device then determines whether its turn to transmit an answer message in response to the request message has come, on the basis of the current priority (that is, the third). When the second slave device, currently having the second highest priority, completes transmitting its answer message, the transmission timing determining section of the fourth slave device determines that it is the turn for the fourth slave device to transmit an answer message. Then, the second answer message transmitting section of the fourth slave device transmits the answer message.

Preferably, the transmission timing determining section determines whether a given slave device has received an answer message from the slave device having the lowest priority among the slave devices whose identification values are stored in the identification value storing section of the slave device.

The identification value storing section of each slave device stores the identification values of the slave devices having higher current priorities than the slave device. Thus, each slave device determines whether its turn to transmit has come by determining whether it has received from a slave device of a priority one-step higher than its priority.

It is possible that when the slave devices transmit to the communication line their answer messages in response to a connection confirming message from the master device, sequentially in the order of descending priorities, the master device sequentially receives the answer messages, and the identification values writing section of the master device writes the identification values carried by the answer messages into the identification value storing section.

For example, if the first to fourth slave devices are able to respond, the identification values of the first to fourth slave devices are written in the identification value storing section of the master device.

If the third slave device, for example, is unable to respond, the identification values of the first, second and fourth slave devices are written into the identification value storing section of the master device.

Then, the first predetermined time setting section of the master device determines the first predetermined length of time respectively for the slave devices corresponding to the identification values written in the identification value storing section so that the first predetermined length of time for the the slave devices become smaller in the order of ascending priorities of the slave devices. For example, if the first to fourth slave devices are able to respond, the section determines the first predetermined length of time for each of slave devices so that the first predetermined lengths of time for the slave devices become less in the order of ascending priorities of the slave device. If the third slave device is unable to respond, the section determines the first predetermined length of time for the first, second and fourth slave devices so that the first predetermined lengths of time for the slave devices become smaller in the order of ascending priorities of the slave device.

According to this embodiment of the invention, the first length of time is determined for the slave devices that are currently able to respond so that the first lengths of time for the slave devices become smaller in the order of ascending priorities of the slave devices. Thereby, the slave devices able to respond transmit answer messages in response to a request message from the master device, sequentially in the order of descending priorities. Collision between answer messages from slave devices on the communication line is thus avoided.

Preferably, a slave device determines that its turn to transmit has come by detecting transmission of an end message from a slave device having a priority immediately higher than its priority. The slave device can transmit an answer message immediately after an end message has been transmitted from a slave device having a priority immediately higher than its priority. The transmission speed can thus be increased.

According to another aspect of the present invention, there is provided a slave device for use in the communication system described above. If the slave device used in the communication system divides an answer message into a plurality of answer messages, the slave device successively transmits the divided answer messages without causing collision with an answer message from a slave device having a priority immediately lower than its priority.

Preferably, if a slave device divides an answer message for a request message into divisional answer messages, the slave device successively transmits the divisional answer messages so that the communication blank duration between the divisional answer messages is a second predetermined length of time which is less than the first predetermined length of time (that is, the communication blank duration after the master device completes receiving an answer message until the master device starts transmitting a request message).

With this construction, if the slave device has a plurality of answer messages to successively transmit, the slave device successively transmits the answer messages before the master device starts to transmit the next request message. The slave device can unfailingly transmit a plurality of answer messages successively without causing its answer messages to collide with a request message from the master device on the communication line.

If the slave device, used in the communication system, has divided answer messages to successively transmit, the slave device can successively transmit the divided answer messages without causing the answer messages to collide with a request message from the master device on the communication line.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 2A and 2B are timing charts illustrating the manner of transmitting messages during the connection confirming mode, when all the control devices are ready to respond, and FIG. 2C is a timing chart illustrating the manner of transmitting messages during the connection confirming mode, when all the control devices except the control device are ready to respond;

FIG. 3A is a timing chart illustrating the manner of transmitting messages during the RAM reading mode, when all the control devices are ready to respond, FIG. 3B is a timing chart illustrating the manner of transmitting messages during the RAM reading mode, when all the control devices except the control device are ready to respond, and FIG. 3C is a timing chart illustrating the manner of transmitting messages during the RAM reading mode, when the control devices are ready to respond but the control devices are not ready to respond;

FIGS. 4A–4C are timing charts illustrating the manner of transmitting messages during the trouble code reading mode;

FIGS. 8–12 are continuing flowcharts illustrating the main routine of the control devices;

FIG. 13A illustrates ECU memories connected to the control device storing identification values when the control device is ready to respond, FIG. 13B illustrates ECU memories connected to the control device storing identification values the control devices are ready to respond, and FIG. 13C illustrates ECU memories connected to the control device storing identification values when the control devices are ready to respond but the control device is not ready to respond;

FIGS. 14A and 14B are timing charts illustrating the manner of transmitting messages during the trouble code reading mode according to a second embodiment;

FIGS. 18A and 18B illustrate connected ECU memories and a corresponding P2n setting table according to the second embodiment;

FIGS. 19A–19F are timing charts of the manner of transmitting messages during the connection confirming mode and the P2n setting mode according to a third embodiment;

FIG. 27 is a timing chart illustrating the manner of transmitting messages according to a fourth embodiment;

FIG. 28 is a timing chart illustrating the manner of transmitting messages according to a fifth embodiment;

FIGS. 29A and 29B are timing charts illustrating a communication operation on according to the international standard ISO-9141-2;

FIG. 30 is a timing chart illustrating the bit format of each of the bytes comprising a message;

FIG. 31 is a timing chart illustrating the frame construction of one message according to the Society of Automotive Engineers (SAE) J1979; and FIGS. 32A–32C are timing charts illustrating data collision between electronic control devices according to the conventional art.

DETAILED DESCRIPTION OF THE PRESENTLY PREFERRED EXEMPLARY EMBODIMENTS

The preferred embodiments of the present invention are hereinafter described with reference to the accompanying drawings.

A first embodiment of the communication system of the invention applied to a vehicle diagnosis system will be first described with reference to FIGS. 1 to 13C.

Figure 1:
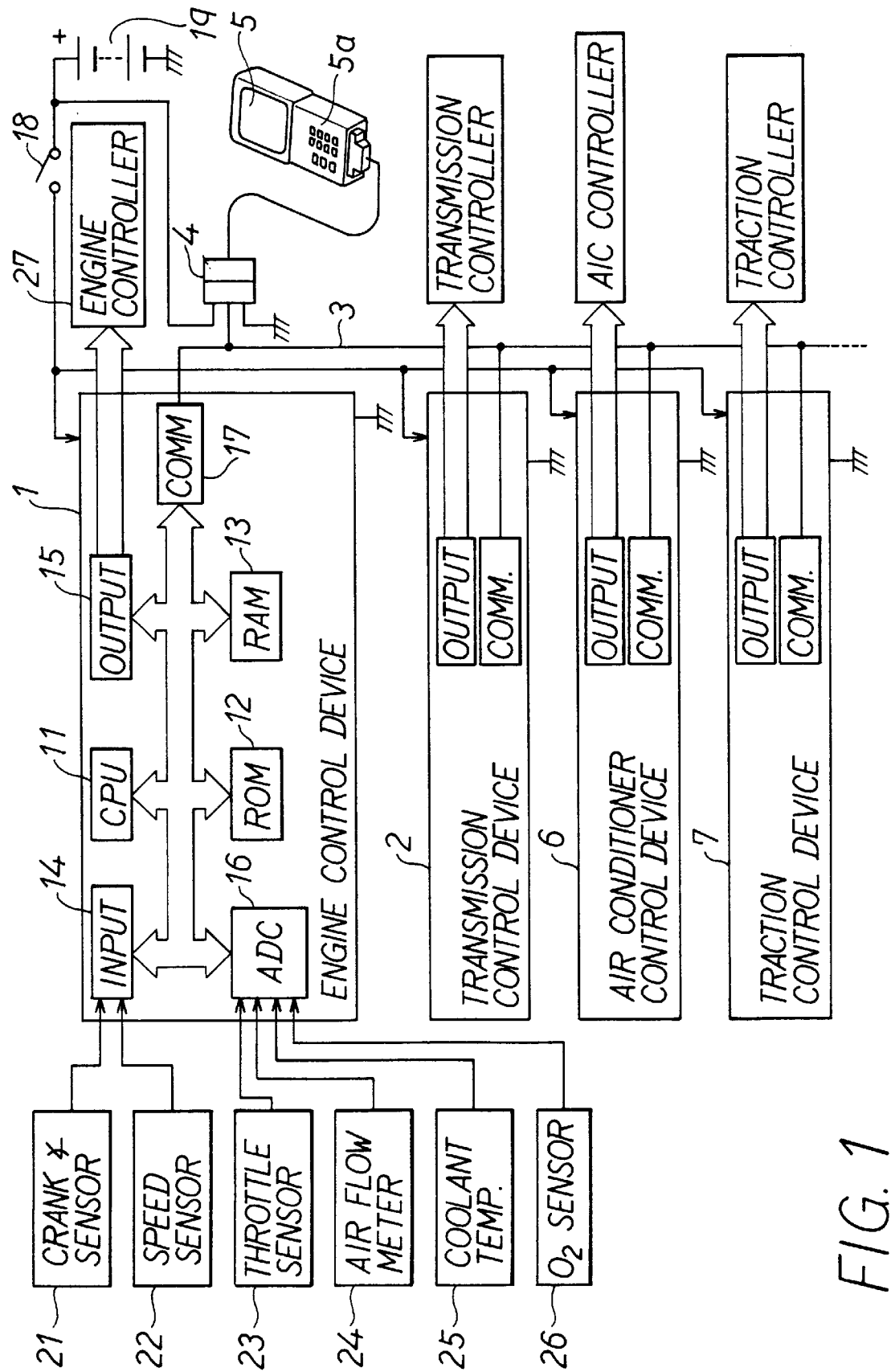
FIG. 1 illustrates the overall construction of an embodiment of the communication system of the present invention.

Referring to FIG. 1, a system according to the first embodiment includes a plurality of electronic control devices (an engine control device 1, a transmission control device 2, an air-conditioner control device 6, a traction control device 7, etc.) as slave devices, and an external diagnosis tester 5 as a master connected to the slave devices by a communication line 3 and connecting section 4 (diagnosis connector). The system performs data communication between the diagnosis tester 5 and the electronic control devices on a one-to-n correspondence.

The electronic control devices are assigned with priorities for the one-to-n communication. When the diagnosis tester 5 transmits a request message (described later) to the electronic control devices, the devices transmits answer messages (described later) in response to the request message in the order of descending priorities. According to this embodiment, the top priority is assigned to the transmission control device 2, and the descending priorities are assigned to the engine control 1, the air-conditioner control 6 and the traction control device 7 in that order.

The diagnosis tester 5 communicates with the electronic control devices by a protocol according to the aforementioned international standard (ISO-9141-2). The elements of the system will be described below, by referring to the engine control device 1 as a representative example of vehicle-installed electronic control devices.

The engine control device 1 comprises a CPU 11, a ROM 12, a RAM 13, an input circuit 14, an output circuit 15, an A/D converter 16, and a communication circuit 17, that is, an input-output buffer circuit for driving the communication line 3.

The input circuit 14 receives sensor signals mainly composed of pulses from a crank sensor 21 for detecting the engine speed or a vehicle speed sensor 22. The A/D converter 16 receives analog signals from other sensors disposed on various portions of the vehicle, such as throttle sensor 23, an air-flow meter 24, a coolant temperature sensor 25, an $O_2$ sensor 26, etc.

These signals are stored in a data region of the RAM as sensor data corresponding to the values detected, and then used by CPU 11 to calculate fuel injection amount or ignition timing. The RAM 13 also has registration regions separately provided for individual counters, individual buffers, individual flags, a connection ECU memory 13a as shown in FIGS. 13A–13C (all described later), etc.

The CPU 11 executes calculations based on the sensor data stored in RAM 13 in accordance with control programs pre-stored in the ROM 12, to determine the amount of fuel to be injected or the ignition timing. The CPU 11 also communicates with the diagnosis tester 5 and executes diagnosis processes designated by messages from the diagnosis tester 5.

The control programs stored in the ROM 12 include a counter program for providing count values in the counters in RAM 13 using software.

The amount of fuel to be injection determined by the CPU 11 is outputted to the output circuit 15, which then outputs a signal corresponding to the fuel injection amount to engine control section 27. Examples of the engine control section 27 include a fuel injection valve.

As in the electronic control devices, the diagnosis tester 5 comprises a CPU, a ROM, a RAM and communication circuits. When a suitable diagnosis mode is selected by using operating section 5a (for example, a keyboard) provided on the outside of the diagnosis tester 5, the tester 5 transmits request messages (described later) in accordance with the selected diagnosis mode to the electronic control devices through the diagnosis connector 4.

The diagnosis tester 5 has a display (not shown) for showing the diagnosis result to an operator in the form of a table, a graph or the like.

The diagnosis connector 4 is electrically connected to a battery 19 via an ignition switch 18. Thus, when the diagnosis tester 5 is electrically connected to the electronic control devices by the diagnosis connector 4, the tester 5 receives power through the diagnosis connector 4.

The diagnosis tester 4 transmits request messages for:

a. ECU connection confirmation diagnosis for determining which of the electronic control devices are ready to respond (hereinafter, referred to as "connection confirming mode").

b. RAM reading diagnosis for reading sensor data from the RAM 13 (hereinafter, referred to as "RAM reading mode").

c. Trouble code reading diagnosis for, if a vehicle-installed sensor or the like is disconnected, retrieving a stored trouble code to the diagnosis tester 5 to determine which of the portions of the vehicle has a failure (hereinafter, referred to as "trouble code reading mode").

When an electronic control device receives a request message from the diagnosis tester 5, the CPU 11 of the device reads sensor data or a diagnosis result from the RAM 13 in accordance with the request message and outputs the data (diagnosis data) to the communication line 3 through the communication circuit 17.

The chronological operation sequence of the connection confirming mode when all the electronic control devices, that is, the transmission control device 2, the engine control device 1, the air-conditioner control device 6 and the traction control device 7, are ready to respond, is now explained with reference to FIG. 2A. The frame format of each message, and the bit format of each byte of each message are as indicated in FIGS. 30 and 31.

Figure 6:
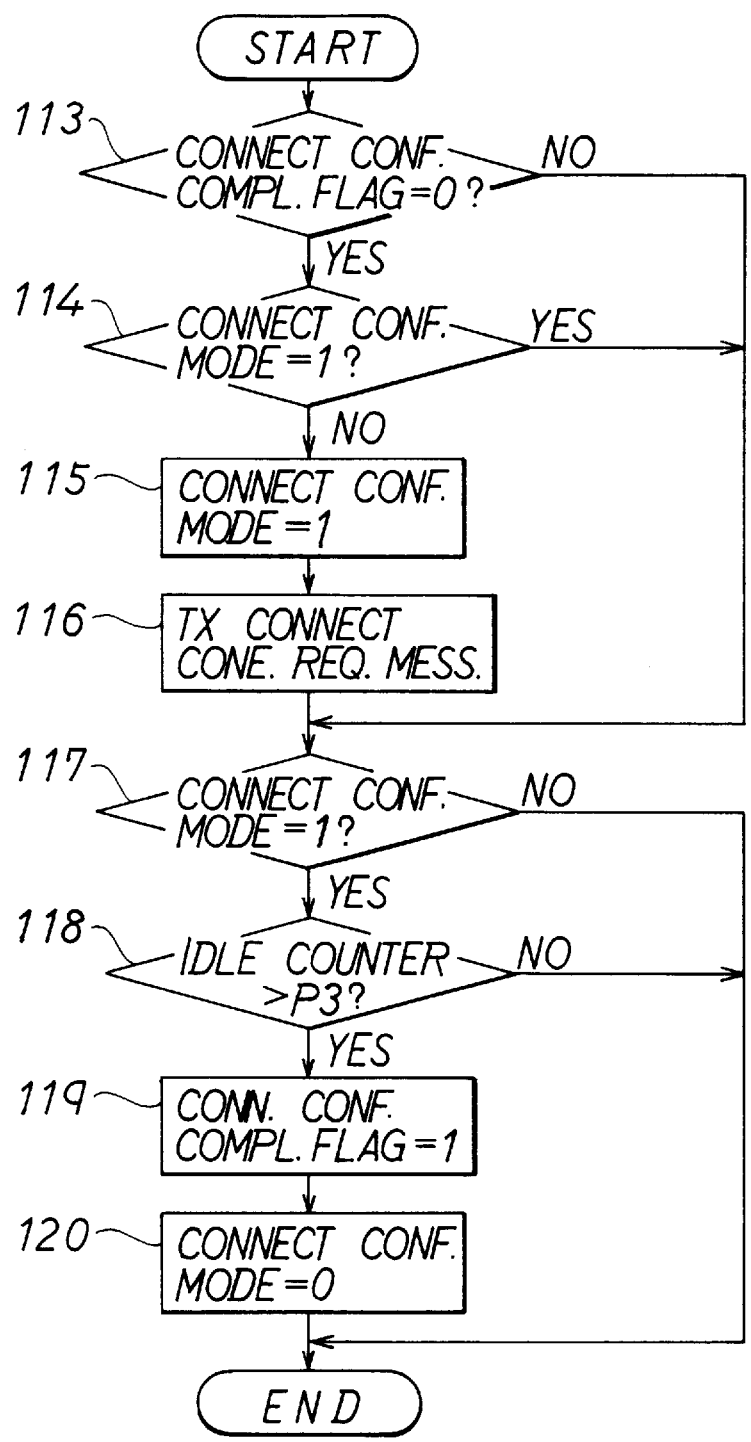
FIG. 6 is a flowchart illustrating a main routine of the diagnostic tester.

When an operator selects the connection confirming mode by operating the keyboard 5a, the diagnosis tester 5 transmits a connection confirmation request message to request ECU connection confirmation (Step 116 in FIG. 6).

Referring to FIG. 2A, the three header bytes of the connection confirmation request message are assigned with pieces of information as follows:

that the message is a request message ($68);

that the message is for all the electronic control devices 2, 1, 6, 7 ($6A); and that the message is from the diagnosis tester 5 ($F1).

The subsequent data byte is assigned with an indication of the mode for requesting ECU connection confirmation ($A0). Then, the CS byte is added at the tail.

When receiving the connection confirmation request message, the electronic control devices 2, 1, 6, 7 outputs their answer messages by the following procedure.

Figure 8:
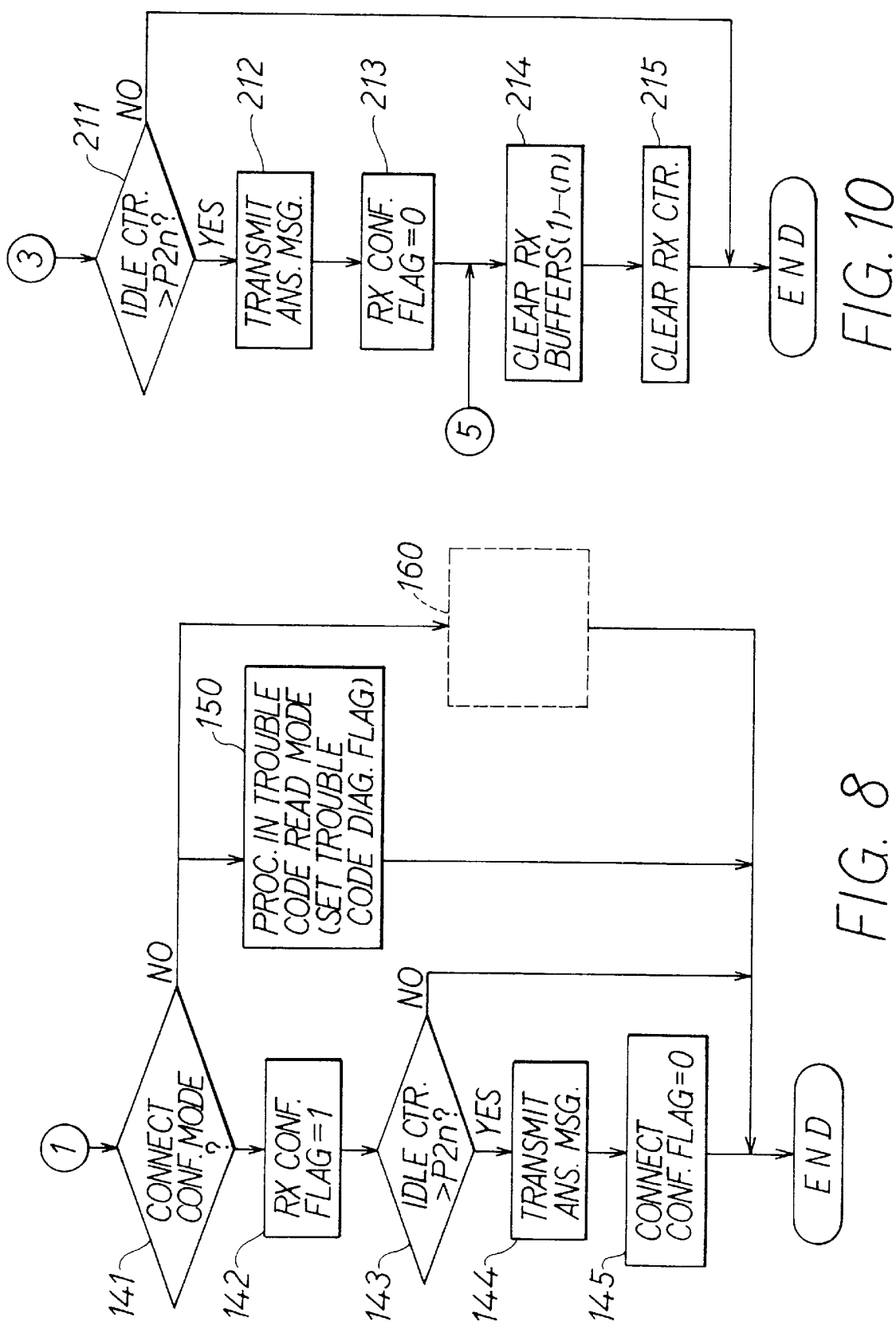

First, the transmission control device 2, having the highest priority, starts to transmit its answer message after the communication blank duration P21 elapses after the diagnosis tester 5 completes transmitting connection confirmation request message (Step 143 in FIG. 8). In this specification, the term "communication blank duration" is used in the meaning of communication blank duration on the communication line 3. The three header bytes of the answer message are assigned with the following pieces of information:

that the message is an answer message ($48);

that the message is for the diagnosis tester 5 ($6B); and that the message is from the transmission control device 2 ($01).

The information piece $01 assigned to the third byte is the identification value of the transmission control device 2 (described later).

The subsequent data byte is assigned with indication of the mode for transmitting ECU connection confirmation ($E0). Then, the trailing CS byte is added.

Since the answer message from the transmission control device 2 is 5-byte long, less than the maximum length allowed for one frame, the engine control device 2 starts to transmit its answer message the communication blank duration P22 after the transmission control device 2 completes transmitting its answer message (Step 143 in FIG. 8). The third byte of the answer message of the engine control device 1 carries information that the message is from the engine control device 1 ($02) (not shown).

The information $02 is the identification value of the engine control device 1 (described later).

In the same manner, the air-conditioner control device 6 and the traction control device 7 sequentially transmit their answer messages. The third byte of the answer message from the air-conditioner control device 6 carries information that the message is from the air-conditioner control device 6 ($03) (not shown). The third byte of the answer message from the traction control device 7 carries information that the message is from the traction control device 7 ($04) (not shown).

The information pieces $03, $04 are the identification values of the air-conditioner control device 6 and the traction control device 7 (described later), respectively.

Figure 9:
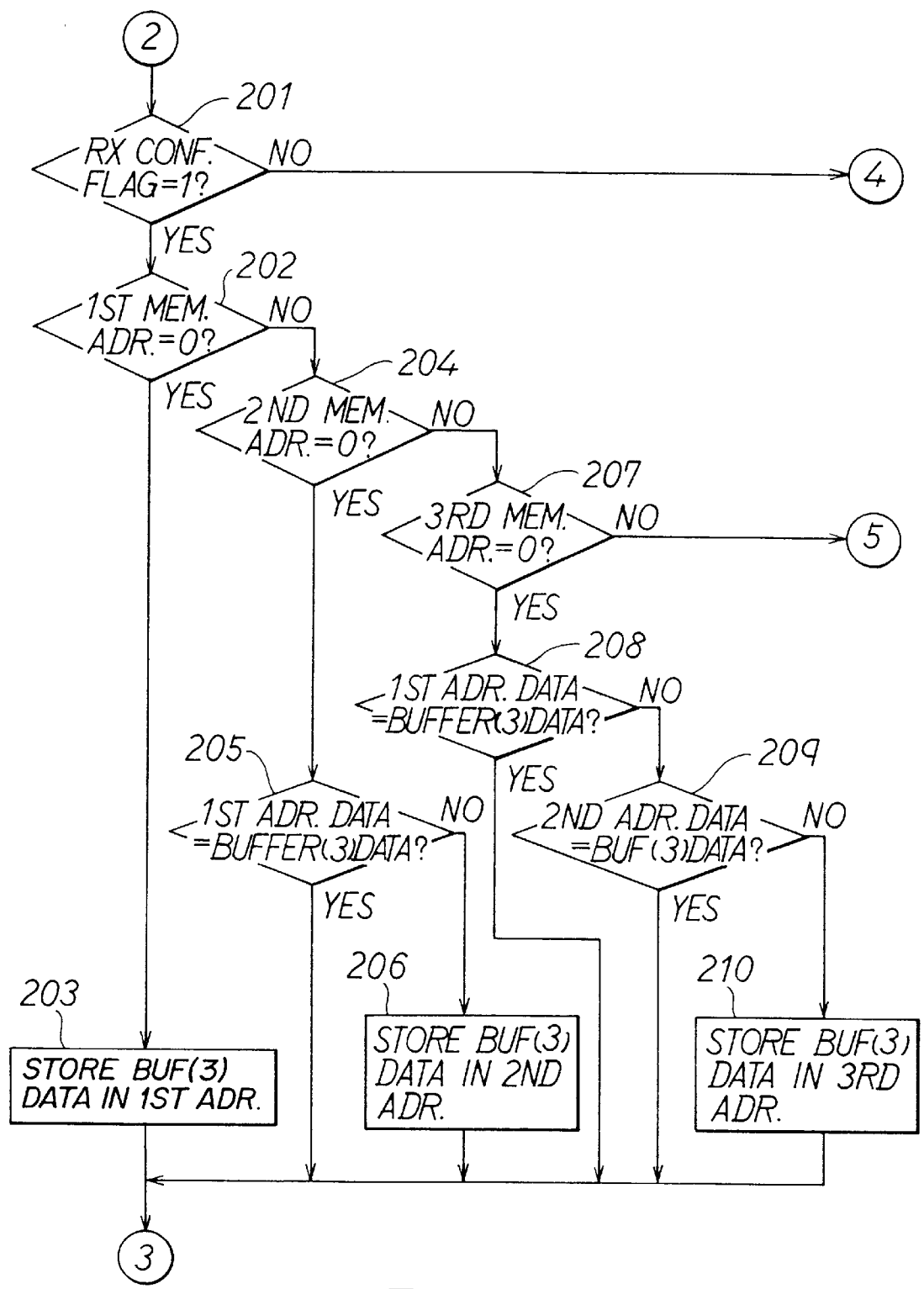

When a given electronic control device receives an answer message from a device of a higher priority, the electronic control device stores the identification value incorporated in the answer message in the connection ECU memory 13a (FIG. 13A) (see Steps 203, 206, 210 in FIG. 9). Based on the identification value stored in the ECU memory 13a, the electronic control device determines its current priority for transmission (described in detail later).

Based on the current priority thus determined, the electronic control device determines whether it is its turn to transmit its answer message (see Steps 223, 225–229 in FIG. 11), during the RAM reading mode or the trouble code reading mode.

In the case indicated in FIG. 2A, the priorities of the devices are not changed from the priorities originally assigned thereto.

The chronological operation sequence of the connection confirming mode when all the control devices 2, 1, 6, 7 are ready to respond has been described with reference to FIG. 2A. Now, the chronological operation sequence of the connection confirming mode when any of the devices is unable to respond will be described with reference to FIG. 2B.

FIG. 2B illustrates the operation sequence in the case where the air-conditioner control device 6 with the third highest priority is unable to respond. The transmission control device 6 transmits its answer message the communication blank duration P21 after the diagnosis tester 5 completes transmitting a connection confirmation request message. After the communication blank duration P22 elapses after the transmission control device 6 completes transmission, the engine control device 1 transmits its answer message.

After the communication blank duration P24 elapses after the engine control device 1 completes transmitting its answer message, the traction control device 7 transmits its answer message (see Steps 211, 212 in FIG. 10).

When the traction control device 7 receives the answer message from the transmission control device 2 and also the answer message from the engine control device 1, the traction control device 7 stores the identification values of the control devices ($01, $02) incorporated in the respective answer messages into the connection ECU memory 13a (FIG. 13A). Based on the identification values stored in the memory 13a, the traction control device 7 determines that the transmission control device 2 and the engine control device 1 are able to respond but the air-conditioner control device 6 is unable to respond (described in detail later). That is, the traction control device 7 determines that it currently has the third highest priority (its current priority).

Based on the current priority, the traction control device 7 determines whether it is its turn to transmit its answer message (see Steps 223, 225–229 in FIG. 11), during the RAM reading mode or the trouble code reading mode.

The chronological operation sequence of the RAM reading mode will be described with reference to FIGS. 3A–3C.

If all the control devices, that is, the transmission control device 2, the engine control device 1, the air-conditioner control device 6 and the traction control device 7, are able to respond as illustrated in FIG. 3A, the diagnosis tester 5 transmits a RAM reading request message for requesting reading data from RAM.

Figure 11:
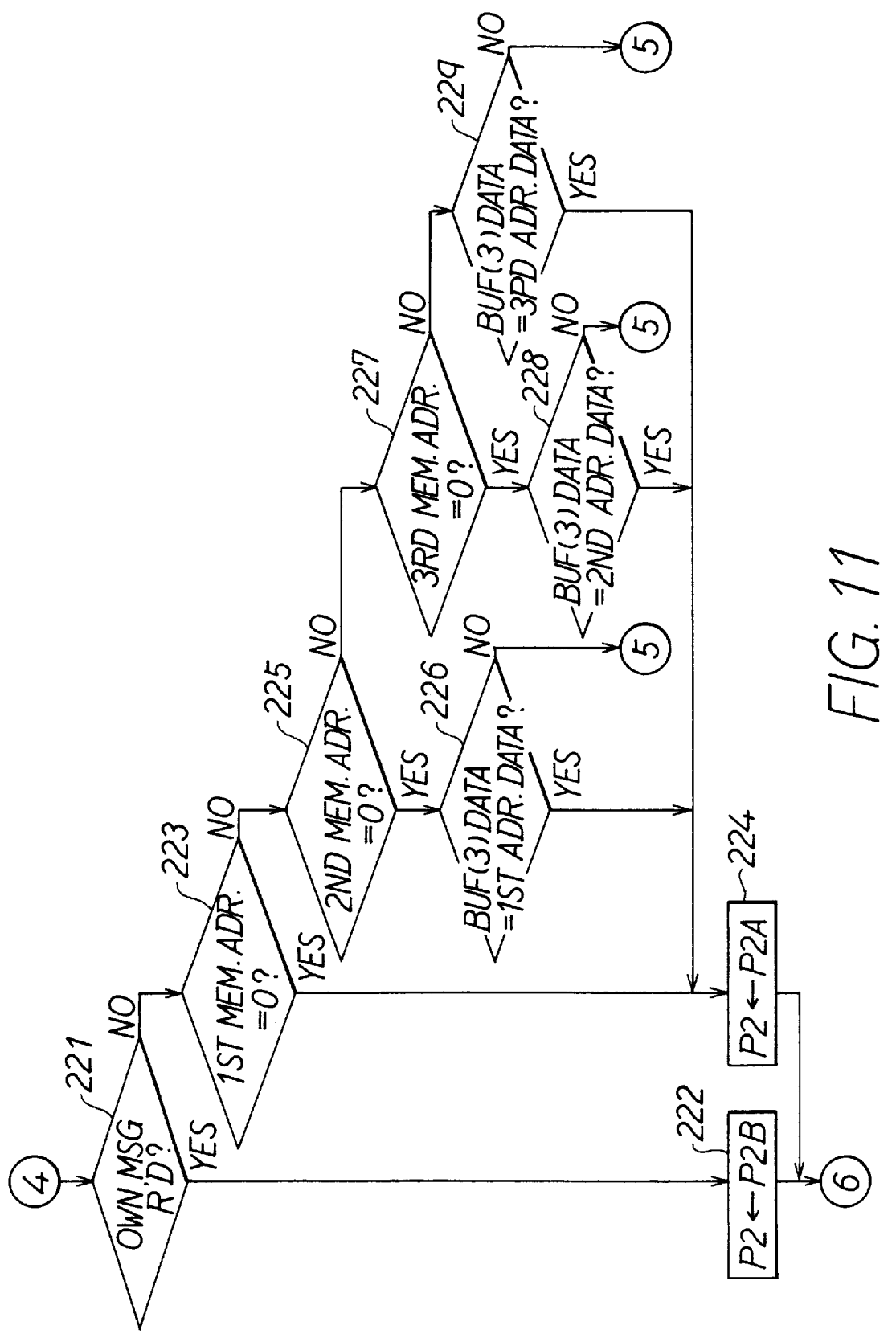
Figure 12:
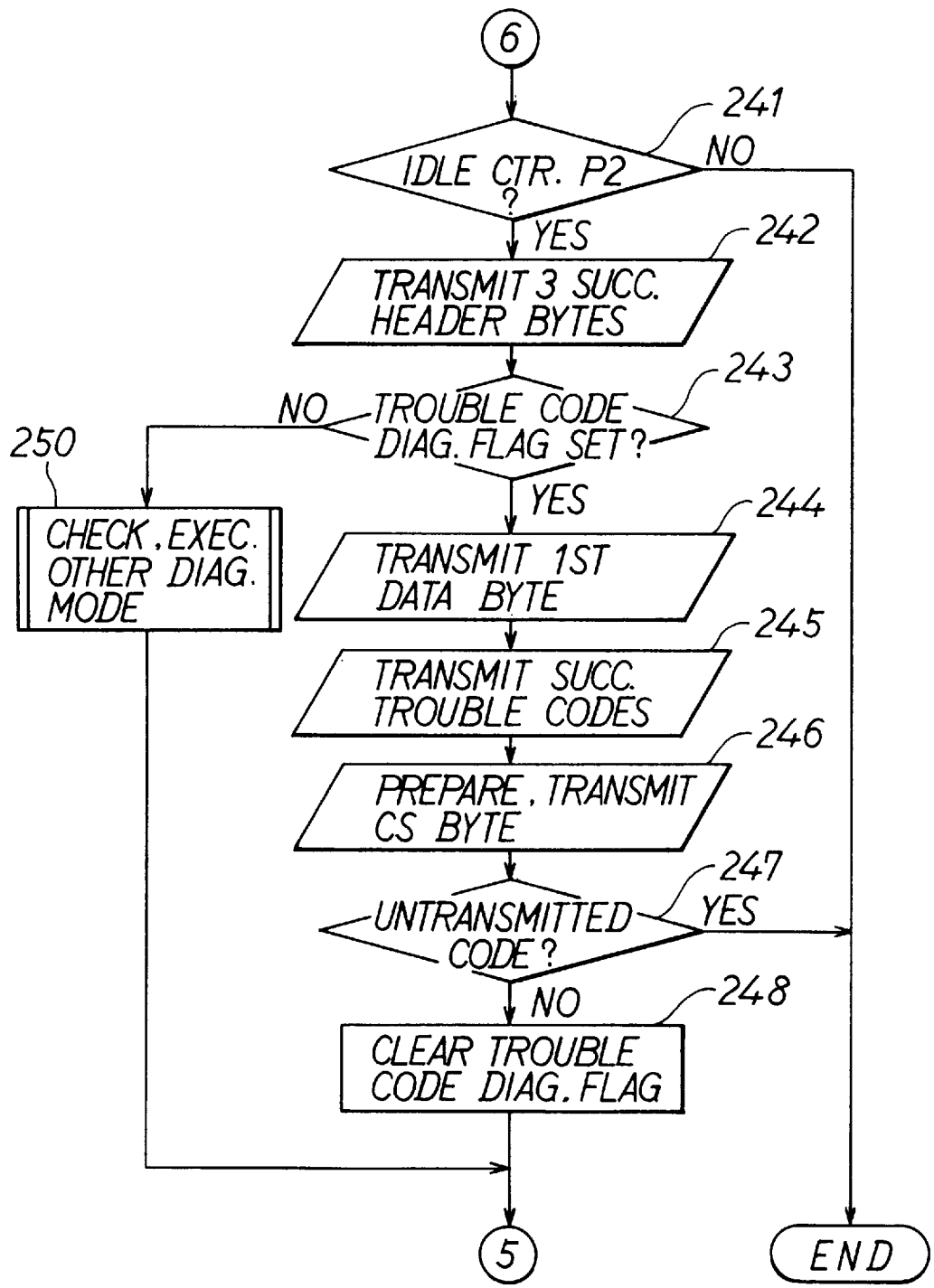

In response to the request message, the control devices 2, 1, 6, 7 sequentially transmit their answer messages spaced by the communication blank durations P2A (see Step 224 in FIG. 11 and Step 241 in FIG. 12).

If the air-conditioner control device 6 alone is unable to respond as indicated in FIG. 3B, the transmission control device 2 transmits its answer message after the communication blank duration P2A elapses after the diagnosis tester 5 completes transmitting the RAM reading request message. Then, the engine control device 1 transmits its answer message after the communication blank duration P2A elapses after the transmission control device 2 completes transmitting its answer message.

Subsequently, after the communication blank duration P2A elapses after the engine control device 1 completes transmitting its answer message, the traction control device 7 transmits its answer message since it already determined in the connection confirming mode that it currently has the third highest priority.

If the transmission control device 2 and the air-conditioner control device 6 are unable to respond while the control devices 1, 7 are able to respond as indicated in FIG. 3C, the engine control device 1 transmits its answer message the communication blank duration P2A after completion of transmission of the RAM reading request message because it already determined in the connection confirming mode that it currently has the highest priority.

Since the traction control device 7 already determined in the connection confirming mode that it currently has the second highest priority, the device 7 transmits its answer message after the communication blank duration P2A elapses after the engine control device 1 completes transmitting its answer message.

Also in the trouble code reading mode, the operation goes as in the RAM reading mode. That is, the control devices determine their current priorities in the connection confirming mode, and determine on the basis of their current priorities whether the timing of their transmissions have come.

The answer message transmitted from the transmission control device 2 during the trouble code reading mode may include many codes. According to this embodiment, the answer message from the transmission control device 2 includes six codes ($0143, $0196, $0234, $0356, $0531, $0661) as illustrated in FIGS. 4A–4C. The transmission control device 2 divides the message into two answer messages.

This embodiment accords to the SAE recommended protocol J1979 where a trouble code is two-byte long. Therefore, if the transmission control device 2 has six trouble codes stored, it must divide the answer message into two frames.

The transmission control device 2 transmits a first answer message of 11 bytes composed of 3 header bytes, one mode indicating byte a for transmitting trouble codes, six bytes for trouble codes ($0143, $0196, $0234), and one CS byte.

After the communication blank duration P2B elapses after completing transmission of the first message, the transmission control device 2 transmits a second answer message of 11 bytes composed of three header bytes, one mode indicating byte for transmitting trouble codes, six bytes for trouble codes ($0357, $0531, $0661), and one CS byte.

When a control device (for example, the transmission control device 2) divides an answer message into first and second answer messages to transmit them, it is possible that the device transmits the second answer message before the device having the next priority (for example, the engine control device 1) transmits its answer message, because the interval P2B between the first and second messages is shorter than the aforementioned communication blank duration P2A.

According to this embodiment, when each of the engine control device 1, the air-conditioner control device 6 and the traction control device 6 has three or less trouble codes stored, it transmits a single answer message.

The chronological operation sequences of the connection confirming mode, the RAM reading mode and the trouble code reading mode have been described with reference to FIGS. 2A–4C. The technique for transmitting messages in such sequence will be described with reference to FIGS. 5–13C.

Figure 5:
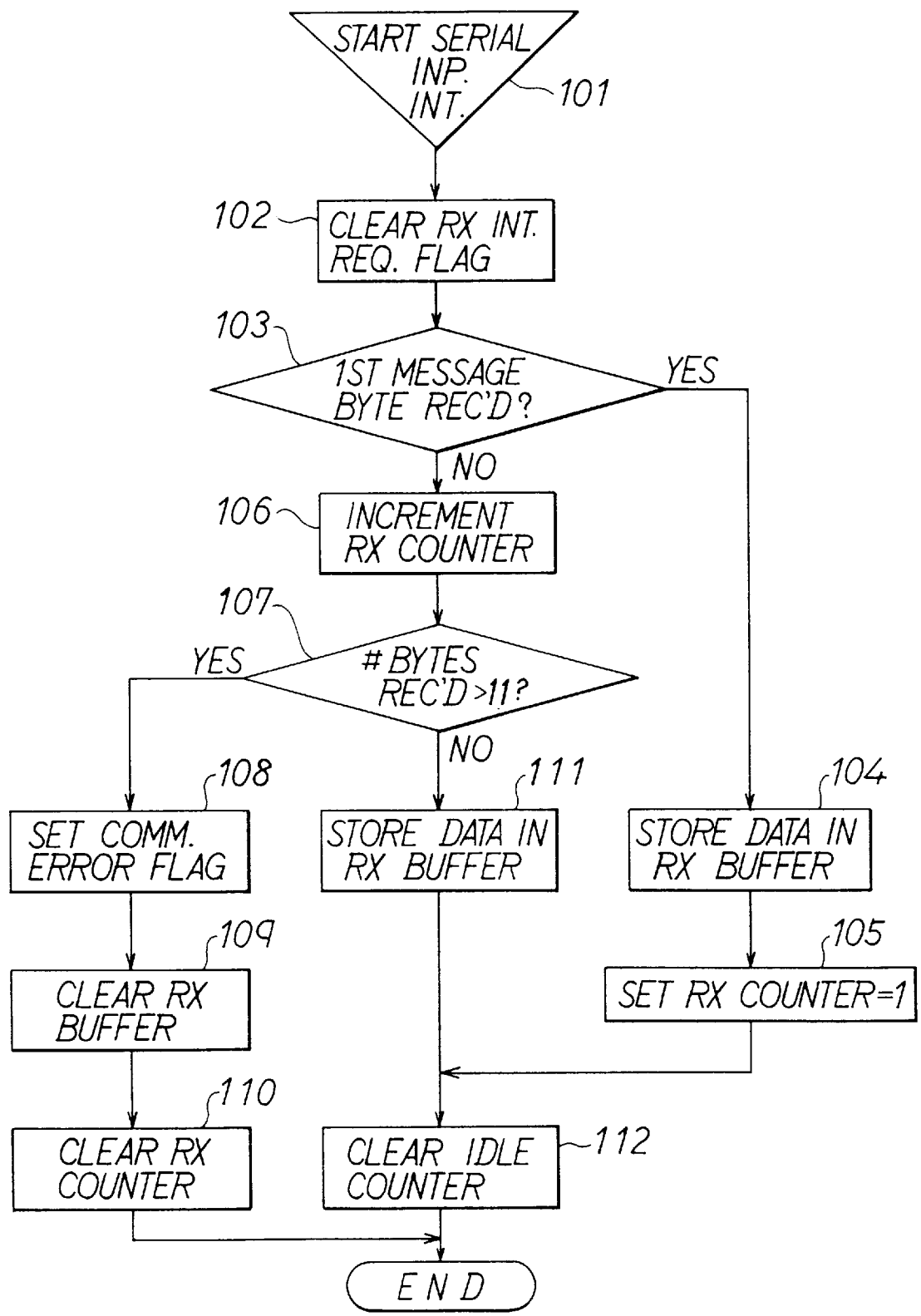
FIG. 5 is a flowchart illustrating the serial input interruption by a diagnostic tester and the control devices according to the first embodiment.

FIG. 5 shows a flowchart illustrating the interruption achieved by the serial input interrupting function of the CPUs of the diagnosis tester 5 and the electronic control devices 2, 1, 6, 7, in order to unfailingly receive messages although it is impossible to determine when the messages will come. FIG. 6 shows a flowchart illustrating a routine of control processing by the CPU of the diagnosis tester 5, the routine being executed when it is determined by using the keyboard 5a that the operation will enter the connection confirming mode. FIGS. 7–12 show flowcharts illustrating a main routine of the control processing by the CPU of each electronic control device, the main routine being executed for each base loop.

All the counters and flags used in the operation described below are set to zero in an initial state where the diagnosis tester 5 and the electronic control devices 2, 1, 6, 7 are energized by turning on the ignition switch 18. The connection ECU memory 13a (described later in connection with FIGS. 13A–13C) is not erased if the ignition switch 18 is turned off. The connection ECU memory is initialized (=0) when the electronic control devices 2, 1, 6, 7 are connected to the power source.

Every time the diagnosis tester 5 completes receiving the bytes of an answer message from any of the electronic control devices 2, 1, 6, 7, the diagnosis tester 5 performs the processing illustrated in FIG. 5, thereby storing the data carried by the received message and the number of bytes thereof into its reception buffers and reception counter.

More specifically, when completing receiving an answer message, the diagnosis tester 5 starts the serial input interruption in Step 101. Step 102 clears a reception interruption request flag to prepare to receive the next byte reception interruption. Step 103 determines whether the byte received is the first byte of the message. If it is the first byte, Step 104 stores the received data into the reception buffer (1).

Step 105 sets 1 in the reception counter. Subsequently, Step 112 clears an idle counter for measuring the length of a communication blank duration to go out of the interruption. The idle counter is incremented by 1 in accordance with the time interruption (for example, 1 ms) by a timer (not shown). Therefore, the idle counter is cleared in Step 112 and then incremented from zero.

If Step 103 determines that the byte received is not the first byte of a message, Step 106 increments the reception counter. The count value is used as basis for determining how many bytes have been received. Step 107 determines whether the number of bytes received exceeds 11, referring to the reception counter. If it exceeds 11, the CPU determines that an abnormality has occurred. Subsequently, Step 108 sets a communication error flag, and Step 109 entirely clears the reception buffer (1)–(n), and Step 110 clears the reception counter, to go out of the processing.

If Step 107 determines that the number of bytes received has not exceeded 11, Step 111 stores the currently received data in the reception buffer (n). Then, Step 112 is performed to go out the processing.

Besides the interruption illustrated in FIG. 5, the diagnosis tester 5 performs a routine illustrated in FIG. 6.

Step 113 checks whether a connection confirmation completion flag has been set to zero in order to determine whether the connection confirming mode continues. If the flag has not been set to zero, the operation goes to Step 117. If the flag has been set to zero, the operation proceeds to Step 114.

Step 114 checks whether the connection confirming mode has been set to 1 in order to determine whether a connection request message has been transmitted. If the connection confirming mode has been set to 1, the operation goes to Step 117. If the connection confirming mode has not been set to 1, Steps 115 and 116 are performed to transmit a connection confirmation request message.

Step 115 sets 1 in the connection confirming mode to note that the operation is currently in the connection confirming mode. Step 116 transmits a connection confirmation request message as indicated in FIG. 2A.

Step 117 determines whether the connection confirming mode has been set to 1. If it has not been set to 1, the operation goes out of the routine. If it has been set to 1, Step 118 checks whether the idle counter indicates the measured time period is exceeding over a communication blank duration P3 (55 ms according to this embodiment) in order to determine whether transmission of the last answer message from the control devices is completed.

The aforementioned communication blank duration P3 is an inter-message interval from completion of response of the control devices 2, 1, 6, 7 until the next request of the diagnosis tester 5 is allowed, as determined in the international standard.

If Step 118 determines that the idle counter does not indicate the time period is exceeding the communication blank duration P3, the operation goes out of the routine. If the idle counter indicates the time period is exceeding the communication blank duration P3, Step 119 sets 1 in the connection confirmation completion flag to note that the connection confirming mode is completed.

Every time a given one of the electronic control devices 2, 1, 6, 7 completes receiving the bytes of a message from the diagnosis tester 5 or another one of the control devices, the electronic control device performs the processing illustrated in FIG. 5, thereby storing the data carried by the received message and the number of bytes thereof into its reception buffers and reception counter.

Besides the interruption illustrated in FIG. 5, the control devices 2, 1, 6, 7 perform a main routine illustrated in FIGS. 7–12.

Step 121 determines whether any data is present in the reception buffer (1) in order to determine whether a message is being received. If any data is present in the reception buffer (1), it is determined that a message is being received, and the operation proceeds to Step 122. If no data is present in the reception buffer (1), that is, if the address data of the reception buffer (1) is $00, the operation goes out of this routine.

Step 122 determines whether the idle counter indicates exceeding over the maximum value (20 ms) of the communication blank duration P1 according to the aforementioned international standard in order to determine whether reception of a message is completed. If the idle counter does not indicate exceeding over that value, it is determined that reception of the message is not completed, and the operation goes out of this routine. If the idle counter indicates exceeding over that value, it is determined that reception of the message is completed, and the sum-checking of this message is performed in Steps 123–125.

For the sum-checking, Step 123 checks the byte length of the received message referring to the count value of the reception counter. Based on the byte length, Step 124 totals the data stored in the reception buffers (1)–(n–1). Step 125 determines whether the value of the lower eight bits of the total (sum) equals the data stored in the buffer (n), that is, the value of the CS byte.

If the sum-checking determines that the values are not equal, it is determined that an abnormality has occurred, and Step 126 sets a communication error flag. Step 127 clear all the reception buffers (1)–(n). Step 128 clears the reception counter to go out of this routine.

If the sum-checking determines that the values are equal, it is determined that the received data are good, and the operation goes to Step 129 to determine whether the contents of the reception buffers (1)–(3), that is, the message header bytes, are good. Step 129 determines the correctness of the headers of both the request message and the answer message.

Step 130 determines whether this message is a request message of an answer message, on the basis of the data stored in the reception buffer (1). The following description will be made respectively for the request message and the answer message.

If Step 130 determines that the message is a request message, the operation goes to Step 141 in FIG. 8. Step 141 determines whether the connection confirming mode is designated, on the basis of the data stored in the reception buffer (4). If the connection confirming mode is designated, Step 142 sets a reception confirming flag to note that a connection confirmation request message has been received from the diagnosis tester 5.

The reception confirming flag is set because of the following reason. Each control device having a lower priority than the transmission control device 2 can transmit its answer message only after all the control devices of higher priorities complete transmitting their answer messages. Therefore, the control device temporarily records that it has received a connection confirmation request message, by setting the flag. Then, when the control devices of higher priorities complete transmitting their answer messages, this control device confirms that the reception confirming flag is set and then transmits its answer message.

Step 143 determines whether the idle counter indicates that the measured time period is exceeding the communication blank duration P2n. The higher priority a control device has, the shorter the communication blank duration stored in the ROM of the device. The communication blank duration P21=25 ms is determined for the transmission control device 2, P22=30 ms for the engine control device 1, P23=35 ms for the air-conditioner control device 6, and P24=40 ms for the traction control device 7.

If Step 143 determines that the idle counter indicates the measured time period is exceeding the communication blank duration P2n, Step 144 prepares and transmits its answer message. As described above, the identification value of the control device is incorporated into the third byte of the answer message prepared in Step 144.

Since no processing in the connection confirming mode is required after transmission of the answer message, Step 145 resets the connection confirming flag to go out of this routine. If Step 143 determines that the idle counter does not indicate the time period is exceeding the communication blank duration P2n, the operation goes immediately out of this routine.

Since the communication blank duration P2n assigned to the control devices decrease in the order of ascending priorities of the control devices, the highest priority control device among the devices ready to respond starts to transmitting its answer message immediately after a connection confirmation request message is transmitted from the diagnosis tester 5.

For example, if the transmission control device 2 is able to respond, the device obtains affirmative determination (YES) in Step 143 earlier than any other control device. Thus, the transmission control device 2 transmits its answer message immediately following the connection confirmation request message from the tester 5, that is, earlier than any other control device.

In another example, if the transmission control device 2 is unable to respond and the engine control device 1 is able to respond, the engine control device 1 obtains an affirmative determination (YES) in Step 143 earlier than any other control device since the transmission control device 2 does not perform processing for transmitting its answer message. Thus, the engine control device 1 transmits its answer message immediately following the connection confirmation request message from the tester 5, that is, earlier than any other control device.

If Step 141 determines that the connection confirming mode is not designated, processing is performed in accordance with the mode based on the data stored in the reception buffer (4). For example, if the trouble code reading mode is designated, Step 150 sets a trouble code diagnosis flag and it is determined whether the idle counter indicates the measured time period is exceeding the communication blank duration P2 (see Step 241). If the idle counter indicates the time period is exceeding that duration, the control device transmits its answer message, resets the trouble code diagnosis flag, and goes out of this processing.

If the RAM reading mode is designated, Step 160 conducts processing similar to that of Step 150.

Next described will be the processing conducted when Step 130 determines that the message is an answer message.

Step 201 in FIG. 9 checks whether the reception confirming flag has been set in order to determine whether the operation is in the connection confirming mode. If it is determined that the operation is in the connection confirming mode, the operation proceeds to Step 202. If it is determined that the operation is not in the connection confirming mode, the operation goes to Step 221 in FIG. 11.

Before the processing of Step 202 is described, the connection ECU memory 13a will be described.

The connection ECU memory 13a is a storage region in the RAM for sequentially storing the identification values incorporated in the answer messages (the third byte of each message) from the devices of higher priorities. That is, the connection ECU memory 13a is means for recording the current priority of the control device by storing all the identification values of the control devices of higher priorities.

For example, if the transmission control device 2, having the highest priority, is able to respond, the connection ECU memory 13a of the engine control device 1, having the second highest priority, stores the identification value $01 of the transmission control device 2 in the first address as indicated in FIG. 13A. Since the transmission control device 2 is the only device that has a higher priority than the engine control device 1, the connection ECU memory 13a of the engine control device 1 stores $00 in the second and third addresses all the time.

Based on the identification values stored in the first to third addresses of the connection ECU memory 13a, the engine control device 1 determines that the transmission control device 2 is the only device that has a higher priority than the engine control device 1, that is, the engine control device 1 has the second highest priority (see Steps 223–229 in FIG. 11).

If the all the control devices, that is, the transmission control device 2, the engine control device 1, the air-conditioner control device 6 and the traction control device 7, are able to respond, the connection ECU memory 13a of the traction control device 7, having the fourth priority, stores the identification values of the other three control devices $01, $02, $03 in the first, second and third addresses respectively as indicated in FIG. 13B.

Thus, the traction control device 7 determines that it has a lower priority than the transmission control device 2, the engine control device 1 and the air-conditioner control device 6, that is, it has the fourth priority.

If the transmission control device 2 and the engine control device 1 are able to respond but the air-conditioner control device 6 is unable to respond, the connection ECU memory 13a of the traction control device 7 stores the identification values $01, $02 of the transmission control device 2 and the engine control device 1 in the first and second addresses and stores $00 in the third address as indicated in FIG. 13C.

In this case, the traction control device 7 determines that it has a lower priority than the transmission control device 2 and the engine control device 1, that is, it has the third priority among the control devices that are able to respond.

As described above, the connection ECU memory 13a of each control device is means for storing the current priority of the control device. Step 202 in FIG. 9 determines whether the first address of the connection ECU memory 13a has a value of zero, that is, whether the first address stores $00. If the determination is affirmative in Step 202, which means that the received answer message is from a control device of a higher priority, then Step 203 stores the data of the reception buffer (3), that is, the identification value incorporated in the received answer message, into the first address of the connection ECU memory 13a. The operation then goes to Step 111 in FIG. 10.

If the determination in Step 202 is negative, Step 204 determines whether the second address of the connection ECU memory 13a has a value of zero. If the determination in Step 204 is affirmative, Step 205 determines whether the data stored in the first address of the connection ECU memory 13a equals the data stored in the reception buffer (3). If the determination is affirmative, the operation goes to Step 211 in FIG. 10.

Step 205 makes affirmative determination in, for example, a case where immediately after the engine control device 1 receives an answer message from the transmission control device 2, the engine control device 1 stores the identification value $01 of the transmission control device 2 into the first address of the connection ECU memory 13a in Step 203 followed by negative determination in Step 211 so that the device 1 goes out of this main routine, and in the next round of this main routine, negative determination in Step 202 and affirmative determination in Step 204 precede Step 205.

If Step 205 makes negative determination, which means that the received answer message is from another control device having a higher priority, then Step 206 stores the data of the reception buffer (3) in the second address of the connection ECU memory 13a as in Step 203. The operation then goes to Step 211 in FIG. 10.

If the determination in Step 204 is negative, Step 207 determines whether the third address of the connection ECU memory 13a has a value of zero. If the determination is affirmative, Steps 208 and 209 conduct processing similar to that in Step 205 for the same purpose.

More specifically, Step 208 determines whether the data currently stored in the first address of the connection ECU memory 13a equals the data stored in the reception buffer (3). Step 209 determines whether the data currently stored in the second address of the connection ECU memory 13a equals the data stored in the reception buffer.

If the two steps make a negative determination, which means that the received answer message is from a third control device that has a higher priority, then Step 210 stores the data of the reception buffer (3) into the third address of the connection ECU memory 13a. The operation then goes to Step 211 in FIG. 10. If either one of the steps makes affirmative determination, the operation immediately goes to Step 211 in FIG. 10.

If Step 207 makes a negative determination, the operation goes to Step 214 in FIG. 10, where all the reception buffers (1)–(n) are cleared. Then, Step 215 clears the reception counter to go out of this routine.

Steps 211 in FIG. 10 determines whether the idle counter indicates exceeding over the communication blank duration P2n. As described above, the communication blank duration varies from one control device to another.

If Step 211 makes affirmative determination, which means that the timing of transmitting an answer message has come, then Step 212 prepares and transmits the answer message. As described above, the identification value of the control device is incorporated in the third byte of the answer message prepared and transmitted in Step 212.

Since no more processing in the connection confirming mode is required after transmission of the answer message, Step 213 resets the reception confirming flag and then Step 214 is performed. If Step 211 makes a negative determination, the operation immediately goes out of this routine.

If Step 201 in FIG. 9 makes a negative determination, that is, if processing other than the connection confirming mode is to be performed, the operation goes to Step 221 in FIG. 11. The control device determines in Step 221 whether the currently received answer message is the answer message transmitted from itself. If the determination is affirmative, Step 222 sets a time P2B (10 ms according to this embodiment) as the criterion time P2 used in Step 241. The operation then goes to Step 241.

Step 222 makes an affirmative determination in, for example, a case where divisional answer messages are successively transmitted as described above in conjunction with the trouble code reading mode with reference to FIGS. 4A–4C; more specifically, the first divisional answer message has been transmitted but the second divisional answer message has not been transmitted.

According to this embodiment, if an answer message is divided into first and second answer messages that are to be successively transmitted, the control device transmits the second answer message the communication blank duration P2B (<P2A) after completing transmission of the first answer message as indicated in FIGS. 4A–4C. Therefore, the control device transmits the second answer message before a control device of a lower priority transmits its answer message. This embodiment thus avoids collision of the messages on the communication line 3.

On the other hand, if Step 221 makes a negative determination, Step 223 determines whether the first address of the connection ECU memory 13a stores a value of zero. If it stores a value of zero, which means that the current priority of the control device stored in Steps 203, 206 and 210 is the highest, the control device determines that it is the time for the control device to transmit its answer message. Then, Step 224 sets a time P2A (25 ms according to this embodiment) as the criterion time P2 used in Step 241. The operation then goes to Step 241.

If Step 223 makes a negative determination, Step 225 determines whether the second address of the connection ECU memory 13a stores a value of zero. If it stores a value of zero, which means that the current priority of the control device is the second highest, the control device determines in Step 226 whether it is the time for the control device to transmit its answer message.

More specifically, Step 226 determines whether the data stored in the first address of the connection ECU memory 13a equals the data stored in the reception buffer (3). If it is determined that they are equal, which means that the received answer message is from a control device having a priority immediately higher than that of the control device, then the control device determines that it is time for the device to transmit its answer message. The operation goes to Step 224.

If Step 226 makes a negative determination, which means that it not yet time for the control device to transmit its answer message, then the operation goes to Step 214 in FIG. 10.

If Step 225 makes a negative determination, Step 227 determines whether the third address of the connection ECU memory 13a stores a value of zero. If it is determined that it has a value of zero, which means that the control device currently has the third priority, then Step 228 determines whether it is time for the control device to transmit its answer message as in Step 226.

If Step 228 makes an affirmative determination, the control device determines that it is time for the control device to transmit its answer message, and the operation goes to Step 224. If Step 228 makes a negative determination, it is not yet time for the control device to transmit its answer message. Then the operation goes to Step 214 in FIG. 10.

The negative determination in Step 227 means that the control device currently has the fourth priority as in a case where the traction control device 7 has the fourth priority when the transmission control device 2, the engine control device 1 and the air-conditioner control device 6 are able to respond.

Therefore, the negative determination in Step 227 is followed by Step 229, where the control device determines whether it is the time for the control device to transmit its answer message as in Step 226 or 228. If Step 229 makes an affirmative determination, that is, if the control device determines that it is time for the control device to transmit its answer message, the operation goes to Step 224. On the other hand, if Step 229 makes a negative determination, that is, if the control device determines that it is not yet the time for the control device to transmit its answer message, the operation goes to Step 214 in FIG. 10.

Step 241 in FIG. 12 determines whether the idle counter indicates the measured time period is exceeding the communication blank duration P2 set in Step 222 or 224. If it is determined that the idle counter does not indicate the time period is exceeding, it is not time for the control device to transmit its answer message, and the operation immediately goes out of this routine. On the other hand, if it is determined that the idle counter indicates the time period is exceeding, Step 242 prepares and transmits the three header bytes of an answer message.

Step 243 determines whether the trouble code reading diagnosis flag has been set. If it is determined that the flag has been set, which means that the trouble code diagnosis is being performed, Step 244 prepares and transmits the first byte of the data bytes. Step 245 then prepares and sequentially transmits trouble codes. Step 246 prepares and transmits a CS byte.

Step 247 determines whether any code to be transmitted remains untransmitted. Step 247 makes an affirmative determination, for example, if the first answer message has been transmitted but the second answer message has not been transmitted as indicated in FIGS. 4A–4C. In such a case, Step 247 makes an affirmative determination, and the operation goes out of this routine. If Step 247 makes a negative determination, Step 248 clears the trouble code diagnosis flag since no more processing for the trouble code diagnosis is required. The operation then goes to Step 214 in FIG. 10.

If Step 243 makes a negative determination, which means that the operation is in the RAM reading mode, Step 250 checks and executes this mode similar to that of Steps 244–248.

Messages are transmitted in manners as illustrated in FIGS. 2A–4C through the control processing illustrated in FIGS. 5–12. The steps in the flowcharts of FIGS. 5–12 constitute the means for achieving the functions thereof.

According to this embodiment, if a given control device divides an answer message into a plurality of answer messages, the control device successively transmits these answer messages with an interval of the communication blank duration P2B, which is shorter than the communication blank duration P2A. Therefore, the control device completes transmitting these answer messages before a control device of a lower priority transmits its answer message. This embodiment thus avoids collision of the messages on the communication line 3.

Furthermore, since the embodiment provides the connection confirming mode for confirming which of the control devices 2, 1, 6, 7 is able to respond, the embodiment avoids problems that would occur without the connection confirming mode, as described below.

If one of the control devices 2, 1, 6, 7, for example, the air-conditioner control device 6, is unable to respond and the processing in the connection confirming mode is not performed, the traction control device 7 can never transmit its answer message because the control device 7 is programmed to start transmitting its answer message only after confirming that the air-conditioner control device 6 has completed transmitting its answer message.

However, the embodiment provides the connection confirming mode, wherein: the diagnosis tester 5 transmits a connection confirmation request message; the control devices sequentially transmit their answer messages in response to the connection confirmation request message; and the identification values contained in the answer messages are stored in the connection ECU memories 13a.

More specifically, each control device has a connection ECU memory 13a, and stores therein the identification value contained in the received answer message if the message is from a control device of a higher priority.

Each control device stores the identification value contained in the received answer message into its connection ECU memory 13a every time it receives an answer message from a control device of a higher priority.

Based on the identification values stored in the connection ECU memory 13a, the control device determines which of the control devices of higher priorities is able to respond and unable to respond.

Because of the connection confirming mode, each control device able to respond determines its current priority by omitting devices unable to respond (if any), on the basis of the identification values stored in the connection ECU memory 13a. Thus, if any of the control devices 2, 1, 6, 7 is unable to respond, all the control devices able to respond, including the devices originally having lower priorities than the device unable to respond, transmit their answer messages in accordance with their current priorities without a failure.

In addition, according to the embodiment, the communication blank durations P2n determined respectively for the control devices 2, 1, 6, 7 for the connection confirming mode become shorter in the order of ascending priorities of the control devices. Thereby, each control device transmits its answer message in accordance with the order of descending priorities of the control devices, without causing collision with a message from another control device on the communication line 3.

Furthermore, according to the embodiment, since each control device stores its current priority in the connection confirming mode and, based on the current priority, determines the timing of transmitting its answer message, the answer messages can be spaced by uniform time intervals (P2A according to this embodiment). Thus, transmission time for answer messages can be minimized.

A second embodiment of the invention will now be described with reference to FIGS. 14A–17. The features thereof different from those of the first embodiment will be described.

A diagnosis tester 5 transmits RAM connection request messages and code request messages to the electronic control devices 2, 1, 6, 7, but does not transmit connection confirmation request messages, as distinguished from the first embodiment.

Messages are transmitted as illustrated in FIG. 14A when all the control devices 2, 1, 6, 7 are able to respond.

After the ignition switch 18 is turned on to energize the diagnosis tester 5 and a desired mode, for example, the trouble code mode, is selected by using the keyboard 5a, the diagnosis tester 5 transmits a code request message. The transmission control device 2 starts to transmit its answer message after a communication blank duration P21 (=25 ms) elapses after the diagnosis tester 5 completes transmitting the code request message.

If the transmission control device 2 has a second answer message to transmit, the control device 2 starts to transmit the second answer message after a communication blank duration P2B (=10 ms) elapses after completing transmission of the first answer message.

If the engine control device 1 has only one answer message to transmit, the control device 1 starts to transmit its answer message after a communication blank duration P22 (=30 ms) elapses after the transmission control device 2 completes transmitting its second answer message.

In a similar manner, if the air-conditioner control device 6 and the traction control device 7 each have only one answer message to transmit, the air-conditioner control device 6 starts to transmit its answer message after a communication blank duration P23 (=35 ms) elapses after the engine control device 1 completes transmission of its answer message. The traction control device 7 starts to transmit its answer message after a communication blank duration P24 (=40 ms) elapses after the air-conditioner control device 6 completes transmission of its answer message.

Messages are sequentially transmitted as illustrated in FIG. 14B when the air-conditioner control device 6, as for example, is unable to respond while the other control devices 2, 1, 7 are able to respond.

The diagnosis tester 5 transmits the code request message, and the transmission control device 2 transmits the first and second answer messages, and the engine control device 1 transmits its answer message, as in the case illustrated in FIG. 14A. Then, the traction control device 7 starts to transmit its answer message the communication blank duration P24 (=40 ms) after the engine control device 1 completes transmission of its answer message.

Means for transmitting messages in such sequence will be described.

Every time a given one of the electronic control devices 2, 1, 6, 7 completes receiving the bytes of a message from the diagnosis tester 5 or another one of the control devices, the electronic control device performs the interruption illustrated in FIG. 5, thereby storing the data carried by the received message and the number of bytes thereof into its reception buffers and reception counter.

Figure 15:
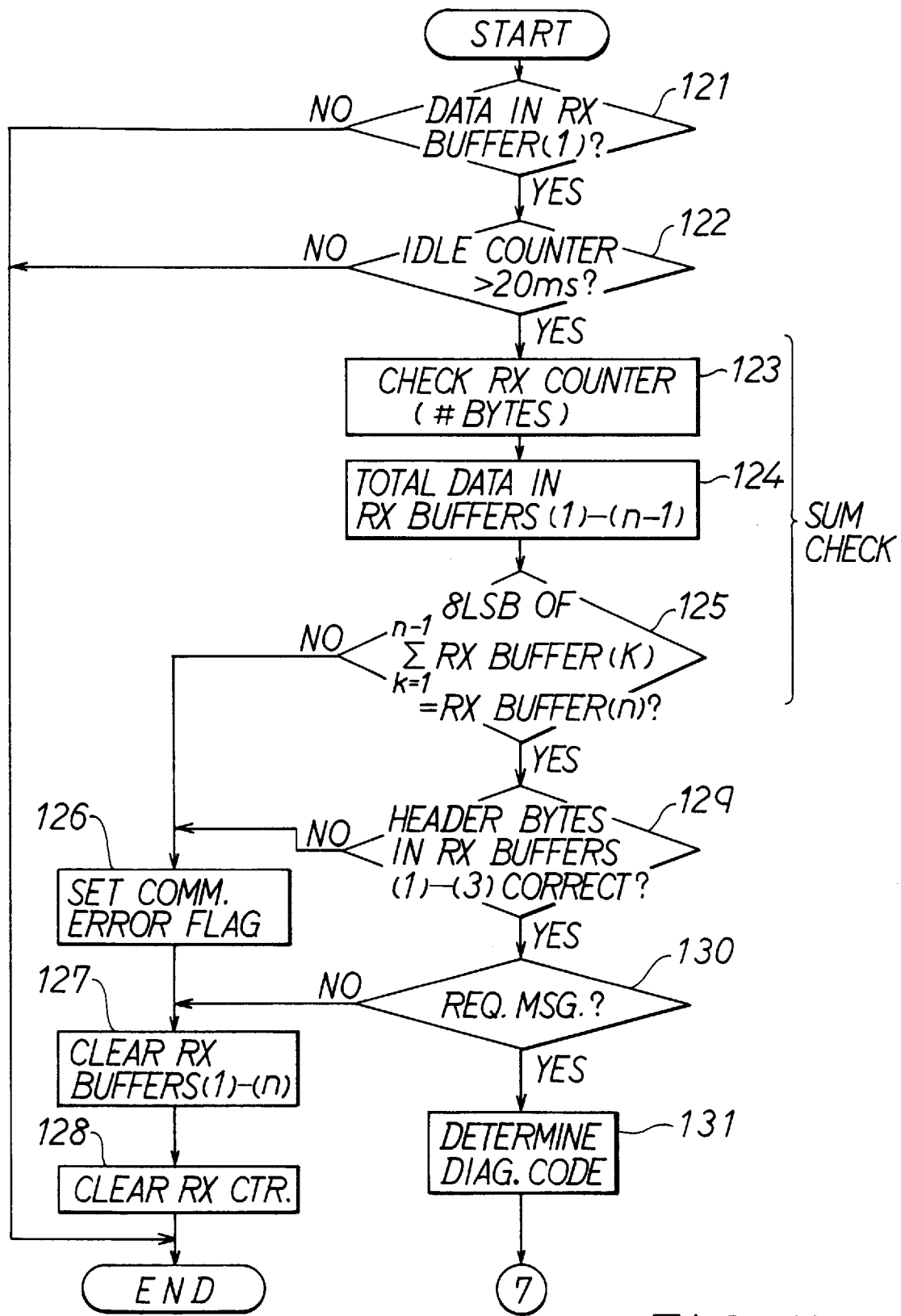
FIG. 15 is a flowchart illustrating a main routine of control devices according to the second embodiment.
Figure 16:
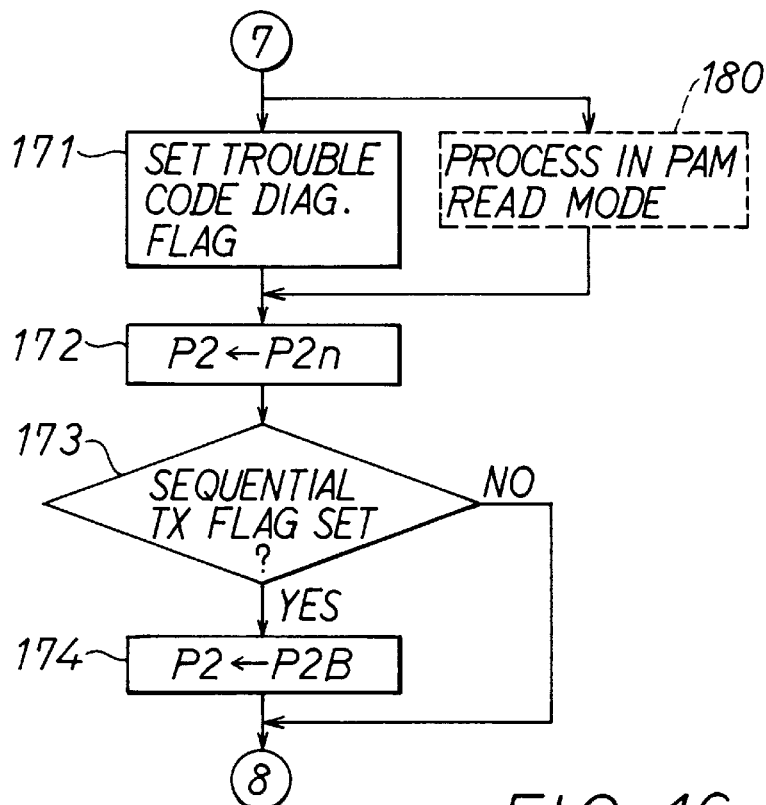
FIGS. 16 and 17 are continuing flowcharts illustrating the main routine of the control devices.
Figure 17:
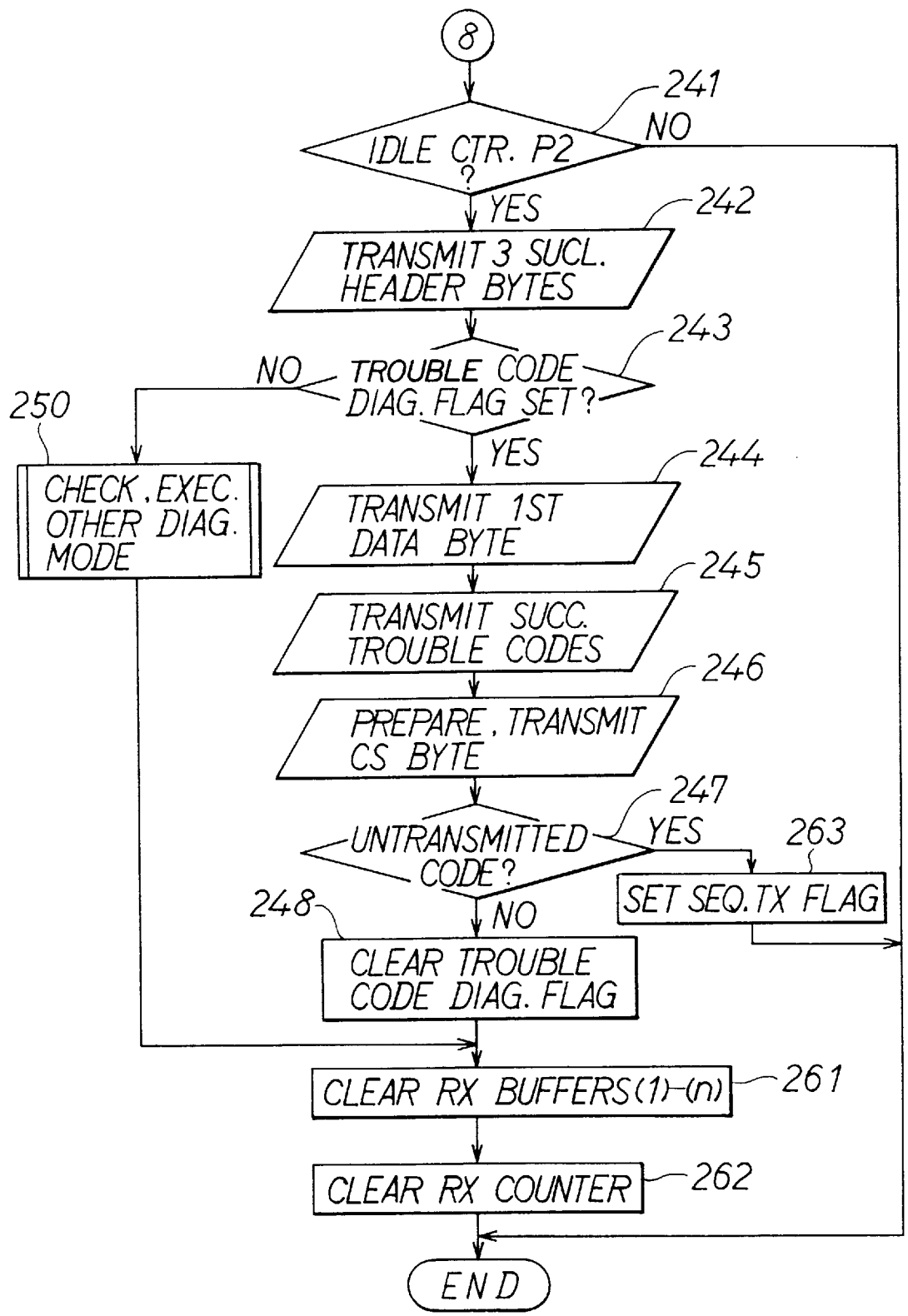

Besides the interruption illustrated in FIG. 5, the control devices 2, 1, 6, 7 perform a main routine illustrated in FIGS. 15–17.

Figure 7:
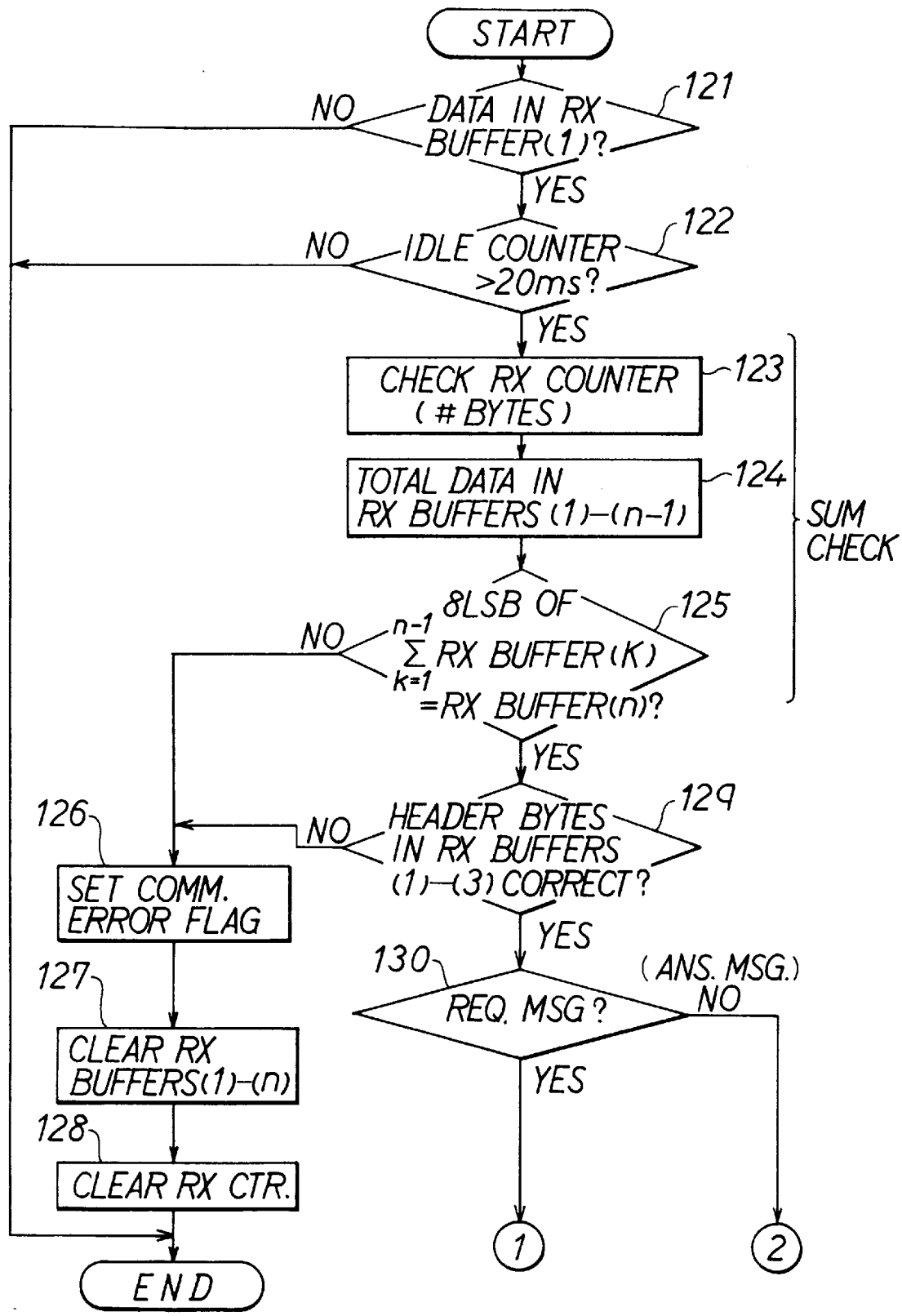
FIG. 7 is a flowchart illustrating a main routine of the control devices.

The processing in Steps 121–130 in FIG. 15 is the same as the processing in Steps 121–130 according to the first embodiment illustrated in FIG. 7. According to the second embodiment, if Step 130 determines that the received message is not a request message, the operation goes through Steps 127, 128 to go out of this routine. If Step 130 makes an affirmative determination, Step 131 determines which of the diagnosis modes the diagnosis tester 5 requests, on the basis of the data stored in the reception buffer (4).

If Step 131 determines that the trouble code reading mode is requested, Step 171 in FIG. 16 sets the trouble code diagnosis flag to note that the control device has received a code request message from the diagnosis tester 5 to which the control device must respond. Then, Step 172 sets a time P2n as the criterion time P2 used in Step 241 in FIG. 17. The operation then goes to Step 173.

According to the second embodiment, the time values P2n determined for the respective control devices become smaller in the order of ascending priorities of the control devices, as in the first embodiment. That is, P21=25 ms is determined for the transmission control device 2, P22=30 ms for the engine control device 1, P23=35 ms for the air-conditioner control device 6, and P24=40 ms for the traction control device 7.

If Step 131 in FIG. 15 determines that the RAM reading mode is requested, Step 180 in FIG. 16 conducts the processing determined for the RAM reading mode.

Step 173 determines whether a successive transmission flag has been set.

The successive transmission flag is set in a case where the control device has two or more answer messages to successively transmit and, for example, the first answer message has been transmitted but the second answer message has not been transmitted yet, as shown in FIGS. 4A–4C. In such a case, Step 174 sets a time P2B (<P2n, 10 ms according to this embodiment) as the criterion time P2 used in Step 241 in FIG. 17. The operation goes to Step 241. On the other hand, if Step 173 makes a negative determination, the operation immediately goes to Step 241.

The processing of Steps 241–248 and 250 in FIG. 17 is the same as in the processing of Steps 241–248 and 250 in FIG. 12. After Step 248 or 250, Steps 261 and 262 conduct the same processing as in Steps 214 and 215 in FIG. 10. If Step 247 determines that one or more codes remain untransmitted, Step 263 sets the successive transmission flag. The operation then goes out of the routine.

According to the second embodiment, if a given control device divides an answer message into a plurality of answer messages, the control device successively transmits these answer messages with an interval of the communication blank duration P2B, which is shorter than any of the communication blank durations P2n (P21–P24). Therefore, the control device completes transmitting these answer messages before a control device of a lower priority transmits its answer message. This embodiment thus avoids collision of the messages on the communication line 3.

In addition, according to this embodiment, the communication blank durations P2n determined for the control devices 2, 1, 6, 7 become shorter in the order of ascending priorities of the control devices (see Step 172 in FIG. 16). Thereby, each control device transmits its answer message in accordance with the order of descending priorities of the control devices, without causing collision with a message from another control device on the communication line 3.

The third embodiment of the invention will be described with reference to FIGS. 18A–26. The features thereof different from those of the first and second embodiments will be described.

The RAM of a diagnosis tester 5 has a connection ECU memory 13a for storing the identification values of the control devices 2, 1, 6, 7 as indicated in FIGS. 18A and 18B, whereas no connection ECU memory 13a is provided in the RAM of any of the control devices.

Messages are transmitted as illustrated in FIGS. 19A–19F when all the control devices 2, 1, 6, 7 are able to respond.

After the ignition switch 18 is turned on to energize the diagnosis tester 5, the diagnosis tester 5 automatically transmits a connection confirmation request message. The control devices 2, 1, 6, 7 then transmit their answer messages sequentially as illustrated in FIG. 2A.

As the diagnosis tester 5 sequentially receives the answer messages, the tester 5 sequentially stores the identification values incorporated in the answer messages into the vacant addresses of the connection ECU memory. In this case, the identification values are stored in the first to fourth addresses of the connection ECU memory 13a as shown in FIG. 18A.

When the diagnosis tester 5 confirms that the communication blank duration on the communication line 3 has reached or exceeded a value P3 (=55 ms), the diagnosis tester 5 assigns the control devices whose identification values have been stored in the connection ECU memory 13a with communication blank durations P2n that must be provided for the control devices to transmit their messages. The communication blank durations P2n assigned to the control devices become shorter in the order of ascending priorities of the control devices.

More specifically, the diagnosis tester 5 transmits to the transmission control device 2 a message that includes: the fourth byte indicating that this message is to assign communication blank durations P2n to the control devices ($10), and the fifth byte instructing the transmission control device 2 to determine P21 (=25 ms) as its communication blank duration P2n ($19).

Immediately after completing transmission of this message, the diagnosis tester 5 transmits to the engine control device 1 a message that includes the fifth byte instructing the engine control device 1 to determine P22 (=30 ms) as its communication blank duration P2n ($1E).

In a similar manner, the diagnosis tester 5 transmits to the air-conditioner control device 6 a message that includes the fifth byte instructing the air-conditioner control device 6 to determine P23 (=35 ms) as its communication blank duration P2n ($23). Then, the diagnosis tester 5 immediately transmits to the traction control device 7 a message that includes the fifth byte instructing the traction control device 7 to determine P24 (=40 ms) as its communication blank duration P2n ($28).

The control devices transmit their messages when they confirm that the communication on the line 3 has been actually spaced by the communication blank durations P2n respectively determined for them by the fifth bytes of the messages.

The message transmission when the air-conditioner control device 6 is unable to respond while the other control devices 2, 1, 7 are able to respond will now be described with reference to FIGS. 20A–20E.

Figure 20A:
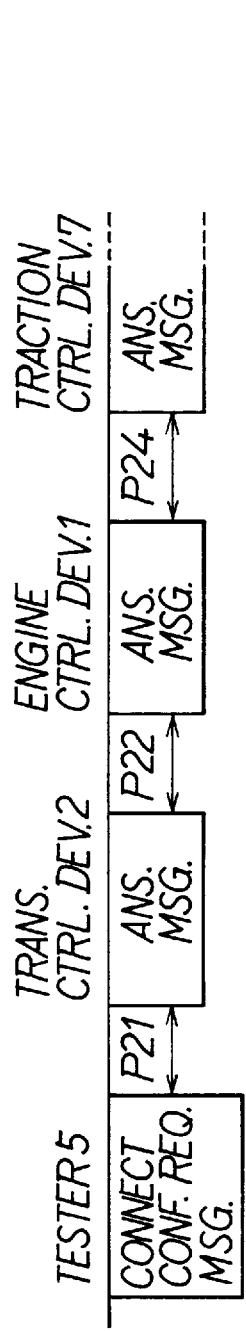
FIGS. 20A–20E are continuing timing charts of the manner of transmitting messages during the connection confirming mode and the P2n setting mode according to the third embodiment.
Figure 20B:
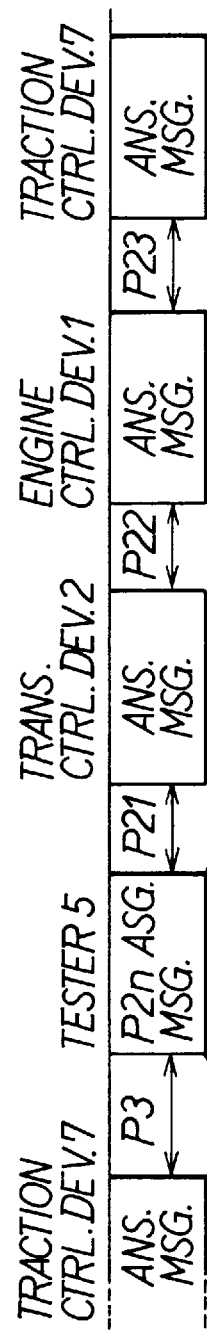
Figure 20C:
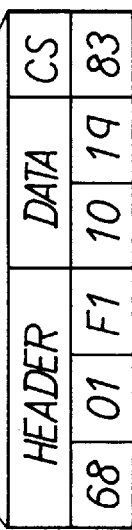
Figure 20D:
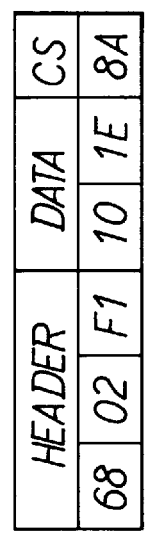
Figure 20E:
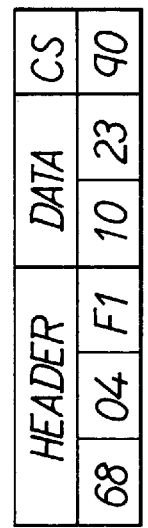

After the ignition switch 18 is turned on to energize the diagnosis tester 5, the diagnosis tester 5 automatically transmit a connection confirmation request message. The control devices 2, 1, 7 then transmit their answer messages sequentially as illustrated in FIG. 20B.

As the diagnosis tester 5 sequentially receives the answer messages, the tester 5 sequentially stores the identification values incorporated in the answer messages into the vacant addresses of the connection ECU memory. In this case, the identification values are stored in the first to fourth addresses of the connection ECU memory 13a with the fourth addresses storing "00" as shown in FIG. 18B.

When the diagnosis tester 5 confirms that the communication blank duration on the communication line 3 has reached or exceeded the value P3 (=55 ms), the diagnosis tester 5 assigns the communication blank durations P2n to the control devices whose identification values have been stored in the connection ECU memory 13a.

More specifically, the diagnosis tester 5 transmits to the transmission control device 2 a message that includes: the fourth byte indicating that this message is to assign communication blank durations P2n to the control devices ($10), and the fifth byte instructing the transmission control device 2 to determine P21 (=25 ms) as its communication blank duration P2n ($19).

Immediately after completing transmission of this message, the diagnosis tester 5 transmits to the engine control device 1 a message that includes the fifth byte instructing the engine control device 1 to determine P22 (=30 ms) as its communication blank duration P2n ($1E).

Immediately after completing transmission of this message, the diagnosis tester 5 transmits to the traction control device 7 a message that includes the fifth byte instructing the traction control device 7 to determine P23 (=35 ms) as its communication blank duration P2n ($23).

The control devices transmits their messages when they confirm that the communication on the line 3 has been actually spaced by the communication blank durations P2n respectively determined for them by the fifth bytes of the messages.

The means for transmitting messages in sequences as described above will be described.

Every time the diagnosis tester 5 completes receiving the bytes of an answer message from any of the electronic control devices 2, 1, 6, 7, the diagnosis tester 5 performs the interruption illustrated in FIG. 5, thereby storing the data carried by the received message and the number of bytes thereof into its reception buffers and reception counter.

Besides the interruption illustrated in FIG. 5, the diagnosis tester 5 performs a main routine illustrated in FIGS. 21–24.

Figure 21:
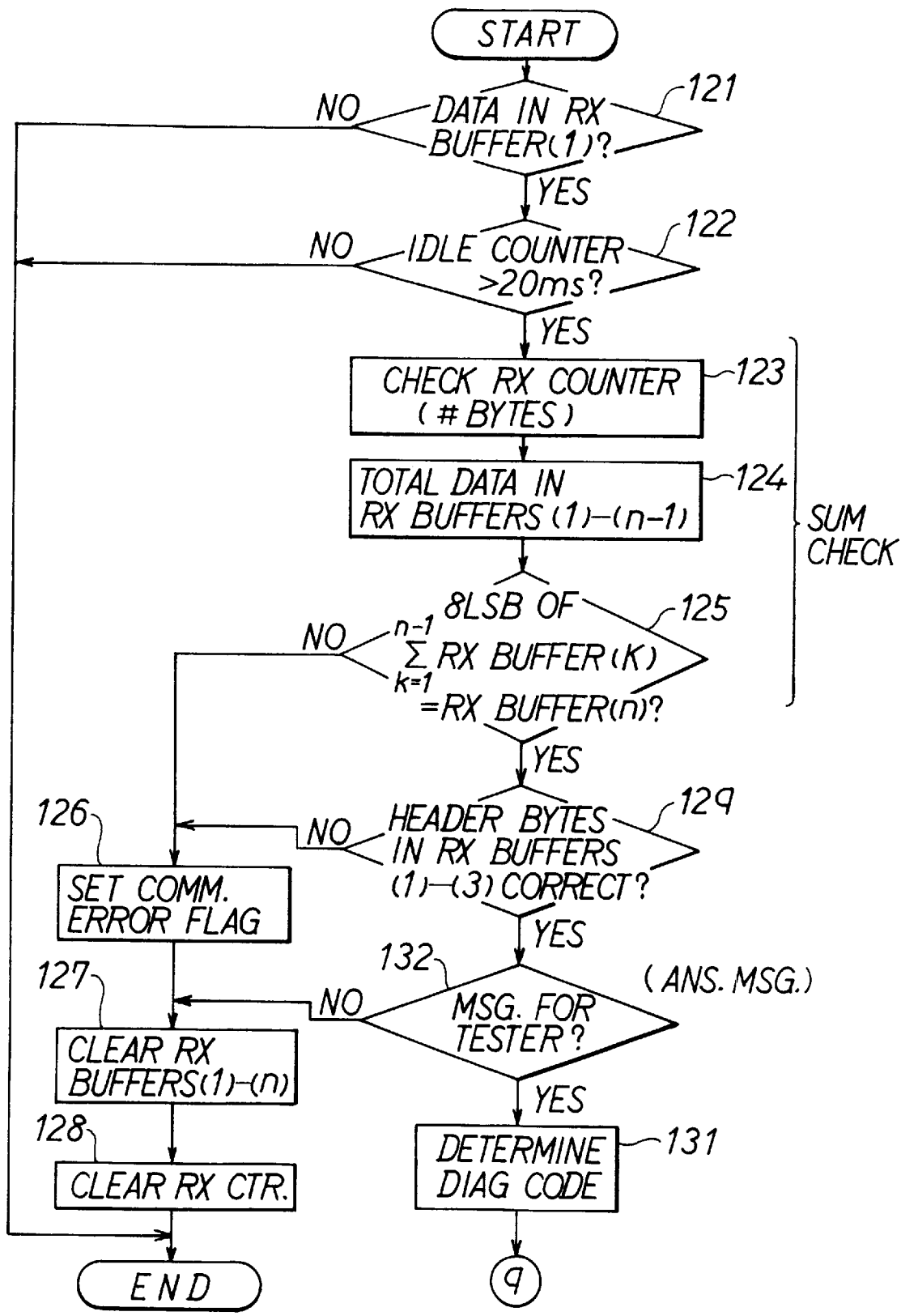
FIG. 21 is a flowchart illustrating a main routine of a diagnostic tester according to the third embodiment.

The processing of Steps 121–129 and 131 in FIG. 21 is the same as the processing of Steps 121–129 and 131 illustrated in FIG. 15. According to the third embodiment, if Step 129 determines that the header of the message stored in the reception buffers (1)–(3) is correct, Step 132 determines whether the received message is for the diagnosis tester 5, that is, whether the received message is an answer message that any of the control devices 2, 1, 6, 7 transmitted to the diagnosis tester 5, on the basis of the data stored in the reception buffer (2).

If Step 132 makes a negative determination, the operation goes through Steps 127 and 128 to go out of this routine. If Step 132 makes an affirmative determination, the operation goes through Step 131 to jump to Step 271 in FIG. 22.

Step 271 checks whether the connection confirming mode is set to 1 (see Step 115 in FIG. 23) in order to determine whether the operation is currently in the connection confirming mode. If Step 271 makes a negative determination, the operation immediately goes out of this routine. If Step 271 makes affirmative determination, Step 272 determines whether the data stored in the reception buffer (3) is 0 (which means that no data is stored in the buffer).

If Step 272 determines that the data stored in the reception buffer (3) is 0, the operation goes out of this routine. If Step 272 makes a negative determination, Step 273 determines whether the data stored in the reception buffer (3) has already been stored in any portion of the connection ECU memory 13a, that is, whether the connection ECU memory 13a has already stored information that the control device from which the message is just received is in the response able state.

If Step 273 makes an affirmative determination, the operation immediately goes out of this routine. If Step 273 makes a negative determination, Step 274 searches for a vacant address in the connection ECU memory 13a. Then, Step 275 stores in the vacant address (i) the identification value stored in the reception buffer (3). The operation then goes out of this routine.

Figure 23:
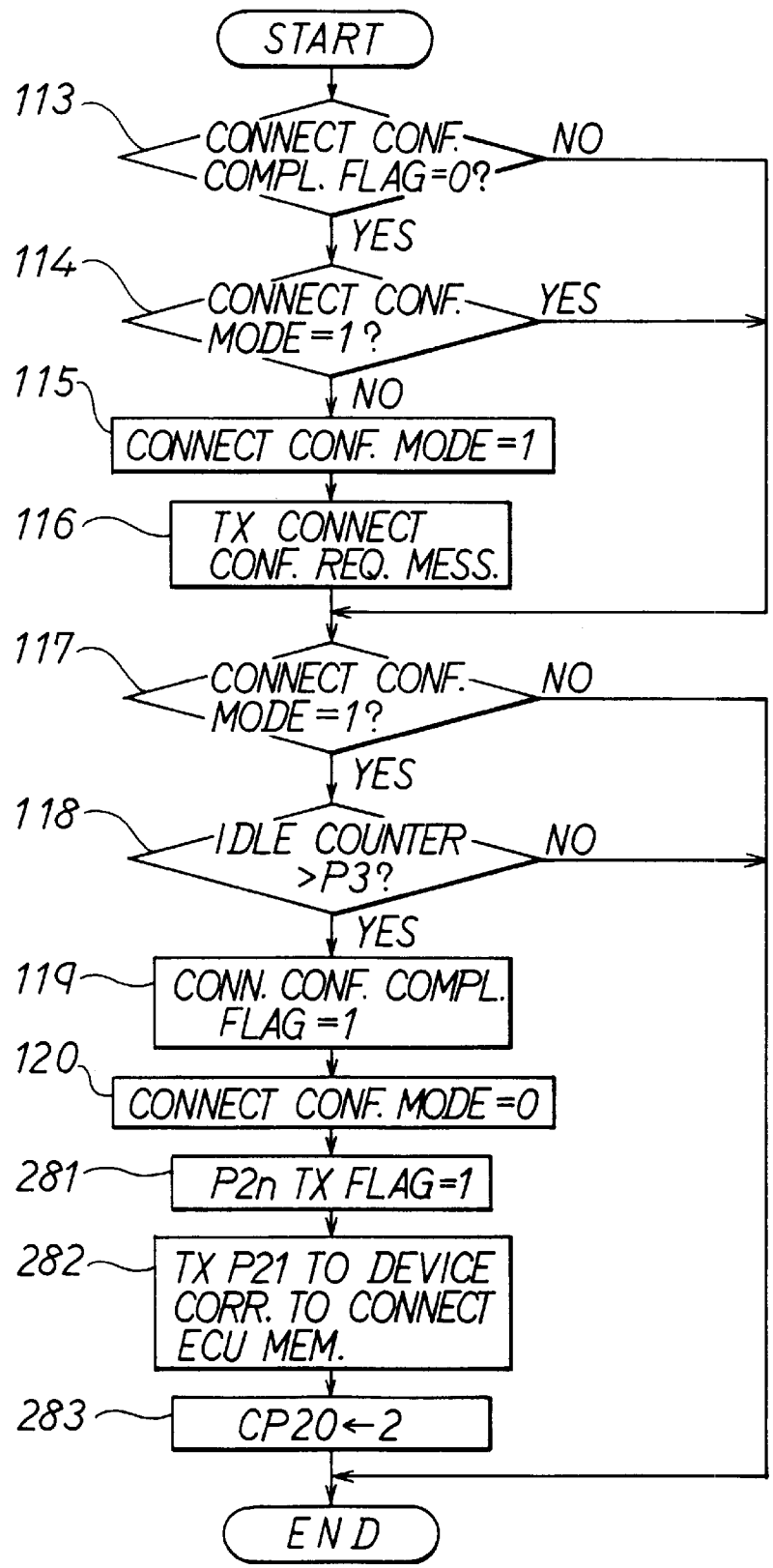

The diagnosis tester 5 starts a main routine illustrated in FIG. 23 when energized. Steps 113–120 in this routine conduct the same processing as in Steps 113–120 in FIG. 6. That is, Steps 113–120 perform processing in the connection confirming mode. After this processing, Step 281 sets 1 in a P2n transmission flag to note that the communication blank durations P2n are being assigned to the control devices that have been confirmed to be able to respond by the connection confirming mode (hereinafter, referred to as "P2n assigning mode").

Subsequently, Step 282 transmits to the control device corresponding to the first address of the connection ECU memory 13a, that is, the control device having the highest priority among the control devices that are able to respond, a message instructing the control device to determine P21 (=25 ms) as the communication blank duration P2n. The fifth byte of this message carries the instruction that the control device set P21 as P2n ($19), as stated above with FIGS. 19A–20E.

Step 283 sets 2 in an index memory CP20 for the control device having the second highest priority among the control devices able to respond. The operation then goes out of the routine.

Figure 24:
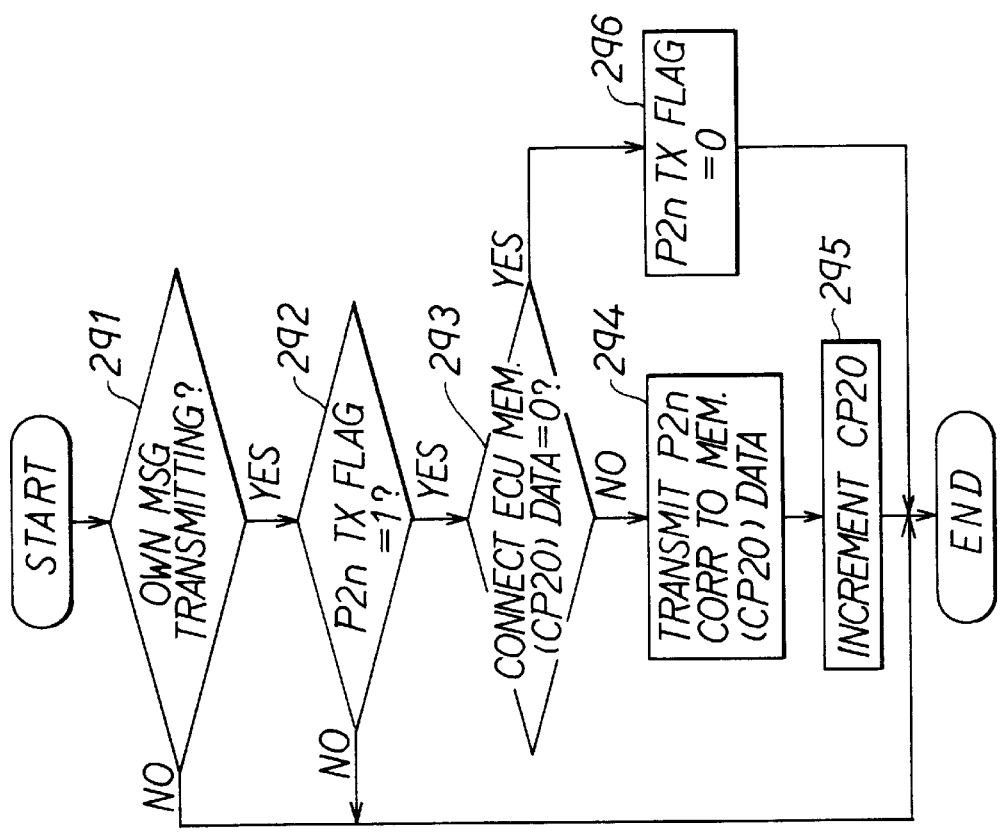
FIGS. 22–24 are continuing flowcharts illustrating the main routine of the diagnostic tester.
Figure 22:
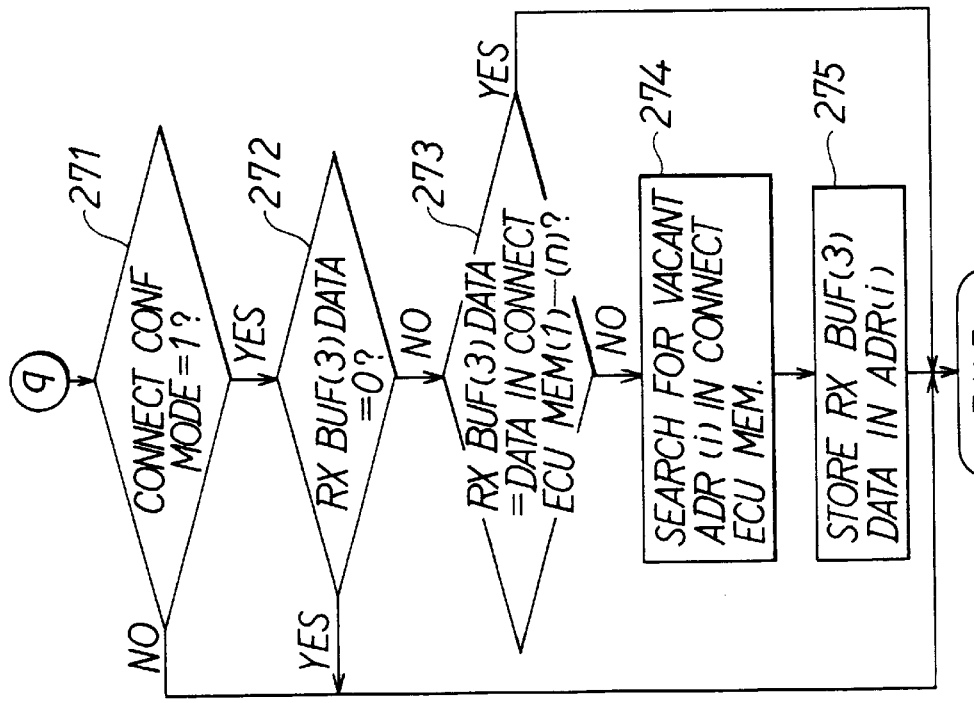

The diagnosis tester 5 also starts a main routine illustrated in FIG. 24 when energized. Step 291 in this routine checks whether the data stored in transmission buffers (1)–(n) equal the data stored in the reception buffer (1)–(n) in order to determine whether the message just received is the message that the diagnosis tester 5 transmitted.

If Step 291 makes a negative determination, the operation immediately goes out of this routine. If Step 291 makes an affirmative determination, Step 292 checks whether the P2n transmission flag has been set to 1 in order to determine whether the operation is currently in the P2n assigning mode. If Step 292 makes a negative determination, the operation immediately goes out of this routine. If Step 292 makes an affirmative determination, the operation proceeds to Step 293.

Step 293 determines whether 0 is stored in the connection ECU memory 13a corresponding to the index memory CP20, that is, whether the processing in the P2n assigning mode is completed for all the control devices that are able to respond. If Step 293 makes a negative determination, which means that the processing is not completed yet, Step 294 conducts processing in the P2n assigning mode for the control device corresponding to the address set in the index memory CP20. Step 295 increments the index memory CP20 to go out of this routine.

Step 294 will be more specifically described. For example, Step 294 is performed for the first time after the processing of Steps 281–283 in FIG. 23, since CP20=2. In this case, the diagnosis tester 5 transmits to the control device corresponding to the second address of the connection ECU memory 13a a message instructing the control device to determine P22 (=30 ms) as its communication blank duration P2n.

If Step 293 makes an affirmative determination, which means that the processing in the P2n assigning mode is completed for all the control devices that are able to respond, Step 296 sets 0 in the P2n transmission flag to note that the P2n assigning mode is finished.

On the other hand, every time the electronic control devices 2, 1, 6, 7 complete receiving the bytes of a message from the diagnosis tester 5, the electronic control devices perform the processing illustrated in FIG. 5, thereby storing the data carried by the received message and the number of bytes thereof into their reception buffers and reception counters.

Figure 25:
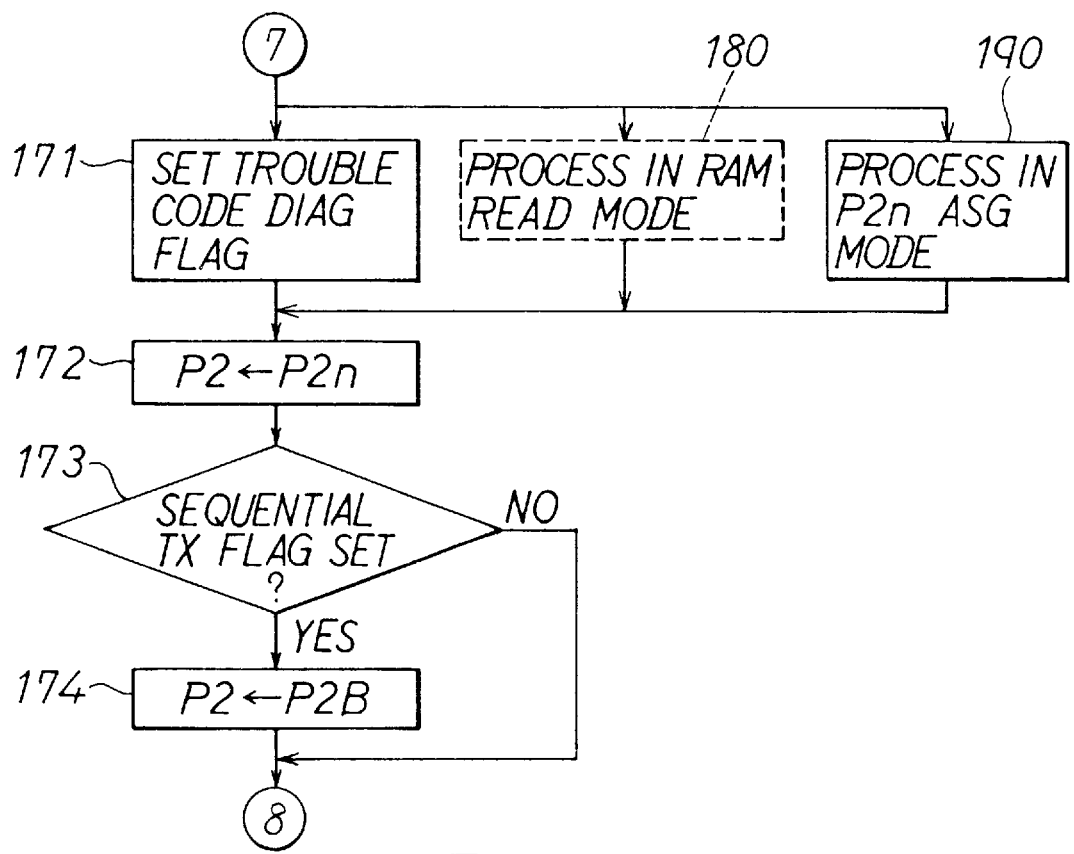
FIG. 25 is a flowchart illustrating a part of the main routine of control devices according to the third embodiment.

Beside the interruption shown in FIG. 5, the electronic control devices 2,1, 6, 7 perform main routines illustrated in FIGS. 15, 25 and 16. If Step 131 in FIG. 15 determines that the diagnosis tester 5 has requested the P2n assigning mode, the operation goes to Step 190 in FIG. 25.

Figure 26:
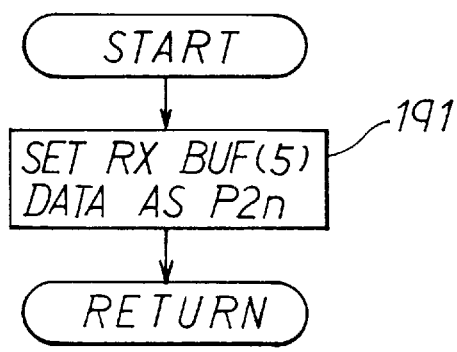
FIG. 26 is a flowchart illustrating the subroutine in Step 190 in the flowchart shown in FIG. 25.

Step 190 conducts a sub-routine illustrated in FIG. 26. Step 191 in the sub-routine sets the communication blank duration P2n to the data stored in the reception buffer (5), that is, the data of the fifth byte of the message transmitted by the diagnosis tester 5 in Step 282 or 292.

Thus, Step 172 sets the data of the fifth byte as P2.

According to the third embodiment, the communication blank duration P2B is shorter than any of the communication blank durations P2n (P21–P24), as in the other embodiments. Therefore, a given control device completes transmitting a plurality of answer messages before a control device of a lower priority transmits its answer message. This embodiment thus avoids collision of the messages on the communication line 3.

In addition, the third embodiment provides the connection confirming mode as in the first embodiment, wherein: the diagnosis tester 5 transmits a connection confirmation request message; the control devices sequentially transmit their answer messages in response to the connection confirmation request message; and then the identification values contained in the answer messages are stored in the connection ECU memories 13a.

More specifically, the diagnosis tester 5 has a connection ECU memory 13a. When receiving a message from a control device able to respond, the diagnosis tester 5 stores the identification value contained in the answer message into the connection ECU memory 13a. Based on the identification values stored in the connection ECU memory 13a, the diagnosis tester 5 determines which of the control devices are able to respond and unable to respond.

Because of the connection confirming mode, the diagnosis tester 5 determines the current priorities of the control devices by omitting devices unable to respond (if any), on the basis of the identification values stored in the connection ECU memory 13a. Thus, if any of the control devices 2, 1, 6, 7 is unable to respond, all the control devices able to respond, including the devices originally having lower priorities than the device unable to respond, transmit their answer messages in accordance with their current priorities without a failure.

In addition, according to the embodiment, the communication blank durations P2n determined for the control devices 2, 1, 6, 7 for the connection confirming mode, the RAM reading request mode and the code requesting mode become shorter in the order of ascending priorities of the control devices. Thereby, each control device transmits its answer message in accordance with the order of descending priorities of the control devices, without causing collision with a message from another control device on the communication line 3.

The fourth embodiment of the invention will be described with reference to FIG. 27. The features of the fourth embodiment different from those of the above-described embodiments will be described.

Although the above embodiments perform one-to-n data communication wherein a single diagnosis tester 5 and a plurality of control devices 2, 1, 6, 7 communicate for the processing in the RAM reading mode, the trouble code reading mode, and the like, the invention may be applied to one-to-one data communication wherein a single diagnosis tester 5 and a single control device communicate for the processing as described above.

For example, the diagnosis tester 5 transmits a first request message (e.g., a code request message) to, for example, the transmission control device 2, and the control device 2 transmits a first answer message after a communication blank duration P2A (=25 ms) elapses after the diagnosis tester 5 completes transmitting the first request message, as illustrated in FIG. 27.

If the control device 2 has a second answer message to transmit following the first answer message, the control device 2 transmits the second, answer message after a communication blank duration P2B (=10 ms) elapses after completing transmission of the first answer message.

When the communication blank duration after completion of the transmission of the second answer message becomes a time P3 according to the international standard ISO-9141-2 (55 ms according to this embodiment, the diagnosis tester 5 transmits a second request message (e.g., a RAM reading request message).

According to the fourth embodiment, the communication blank duration P2B between the first and second answer messages is shorter than the communication blank P3 duration between the second answer message and the next request message. In this manner, the diagnosis tester will not transmit a request message while the control device 2 is transmitting its answer messages. Thus, the control device 2 can successively transmit its answer messages without an interruption by a request message from the diagnosis tester 5.

Although, according to the above embodiments, each control device is provided with a step (Step 222 or 174) to determine that the communication blank duration P2B between answer messages to be successively transmitted be shorter than the other communication blank durations P2A, P2n, such a step may be provided only for the control devices (which can be a single device) that are likely to have a plurality of answer messages to successively transmit.

Although the first and third embodiments employ the connection confirming mode to determine which of the control devices 2, 1, 6, 7 are able to respond and unable to respond, the ROM of each control device may be used to store the data on the control devices having higher priorities so that the data will be used as a basis for this determination.

More specifically, the ROM of each electronic control device is arranged to store the data of the control device (the control device A) having a priority one step higher than its own priority and the control device (the control device B) having a priority two step higher than its own priority. If the control device A is unable to respond and the control device B is able to respond, the control device A will not transmit its answer message after the control device B completes transmitting its answer message. Utilizing this situation, the control device can determine that the control device A is unable to respond.

According to an embodiment modified from the first and third embodiments, the transmission of an answer message in Steps 242–246 may be performed as illustrated in FIG. 28. That is, after completing transmission of its answer message, the control device may transmit an end message (for example, one byte indicating its identification value) to notify the other control device of its completion of transmission of the message.

According to this embodiment, each control device can determine the arrival of its turn to transmit its answer message by detecting the end message transmitted from the control device having a current priority immediately higher than its own current priority. This embodiment can reduce the criterion time used in Step 122 to a time shorter than 20 ms, thus increasing the transmission speed.

Although the above-described embodiments have been described in conjunction with a communication system wherein the diagnosis tester 5 operates as a master device and the electronic control devices operate as slave devices, the invention can be applied to a communication system wherein a given one of electronic control devices is provided as a master device and the other devices are provided as slave devices. Moreover, although the above embodiments have been described in conjunction with application to vehicles, the communication system of the invention may be applied to fields other than vehicles.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A communication system comprising:

a communication line;

a master device for transmitting via said communication line a request message to request that a predetermined processing be performed;

a plurality of slave devices, connected to said master device by said communication line, for, responsive to receipt of said request message via said communication line, transmitting via said communication line answer messages which are in an order corresponding to descending priorities of said slave devices;

wherein said slave devices transmit answer messages in such a manner that a communication blank duration on said communication line between an answer message from a given one of said slave devices and an answer message from a slave device having a priority immediately lower than a priority of said given one of said slave devices is a first predetermined length of time; and at least one of said slave devices divides an answer message into a plurality of divisional answer messages if said answer message includes more than said predetermined amount of data, and sets said communication blank duration between said divisional answer messages before transmitting said divisional answer messages in such a manner that said communication blank duration between said divisional answer messages is a second predetermined length of time that is less than said first predetermined length of time, and then transmits said divisional answer messages.

2. The communication system of claim 1, further comprising:

message transmission checking means for determining whether any of said divisional answer messages remains untransmitted;

communication blank duration setting means for setting said communication blank duration on said communication line to said second predetermined length of time if said message transmission checking means has determined that there is at least one answer message remaining; and communication blank duration checking means for determining whether said communication blank duration on said communication line has lasted for said second predetermined length of time; wherein a slave device in said plurality of slave devices is for transmitting at least one answer message remaining when said communication blank duration checking means determines that said communication blank duration on said communication line has lasted for said second predetermined length of time.

3. The communication system of claim 1, wherein said first predetermined length of time is determined in advance respectively for said slave devices in such a manner that said first predetermined length of time becomes less in an order of ascending priorities of said slave devices.

4. The communication system of claim 1, wherein:

said master device comprises connection confirming message transmitting means for transmitting a connection confirming message to confirm which of said slave devices is able to transmit an answer message via said communication line;

each of said slave devices comprises first answer message transmitting means for, in response to a connection confirming message from said communication line, transmitting a first answer message that includes an identification value of said control device to said communication line, identification value storing means for sequentially storing said identification value included in said answer message transmitted by said first answer message transmitting means, and priority setting means for determining current priorities based on said identification value stored in said identification storing means; and that said master device is for transmitting a request message, and said slave devices are for receiving said request message and transmitting answer messages, based on current priorities determined by said priority setting means.

5. The communication system of claim 4, wherein:

each of said slave devices includes one of said identification value storing means;

said priority setting means is identification writing means for, when a given one of said slave devices receives an answer message transmitted by said first answer message transmitting means of a slave device having a higher priority than said given one of said slave devices via said communication line, writing said identification value included in that answer message into said identification value storing means of said given one of said slave devices; and each of said slave devices further includes transmission timing determining means for, when said slave device receives a request message from said master device through said communication line, determining whether a turn for said slave device to transmit an answer message in response to that request message will come next, based on said identification value written into said identification value storing means, and second answer message transmitting means for, when said transmission timing determining means determines that said turn for said slave device to transmit an answer message in response to that request message will come next, transmitting that answer message to said communication line.

6. The communication system of claim 5, wherein:

said transmission timing determining means determines whether said turn for said slave device to transmit an answer message in response to that request message will come next, by determining whether said slave device has received an answer message from a slave device having a lowest priority among slave devices whose identification values have been written in said identification value storing means of said slave device.

7. The communication system of claim 4, wherein:

said identification value storing means is provided in said master device; and said priority setting means includes identification value writing means for, when said master device receives an answer message transmitted by said first answer message transmitting means of any one of said slave devices via said communication line, writing an identification value included in that answer message into said identification value storing means; and first predetermined time setting means for determining said first predetermined length of time for a slave device corresponding to said identification value written in said identification value storing means in such a manner that said first predetermined length of time respectively determined for said slave devices becomes less in an order of ascending priorities of said slave devices.

8. The communication system of claim 5, wherein said second answer message transmitting means is further for adding data to an end of an answer message, said data indicating that said answer message is a last message.

9. A slave device for use in a communication system wherein said slave device is connected to a master device and at least one other slave device by a communication line, said slave device comprising:

means for, upon receiving via said communication line a request message from said master device requesting that a predetermined process be performed, transmitting an answer message responsive to said request message to said communication line, said slave device being assigned with a priority determined in relation to said at least one other slave, so that a communication blank duration on said communication line between said answer message and an answer message from a slave device having a priority consecutive with a priority of said slave device is a predetermined length of time; and dividing means for, if said slave device has an answer message having more data than a predetermined amount to transmit, dividing said answer message into divisional answer messages and setting a communication blank duration between said divisional answer messages successively before transmitting said divisional answer messages so that said communication blank duration on said communication line between said divisional answer messages is a second predetermined length of time which is less than said first predetermined length of time and then transmitting said divisional answer messages.

10. A communication system comprising:

a communication line;

a master device for transmitting via said communication line a request message to request that a predetermined processing be performed;

a plurality of slave devices, connected to said master device by said communication line, for, responsive to receipt of said request message via said communication line, transmitting via said communication line answer messages;

wherein said master device transmits a request message after confirming that a communication blank duration on said communication line has become a first predetermined length of time; and if said slave device has an answer message having more data than a predetermined amount to transmit, said slave device divides said answer message into divisional answer messages and sets a communication blank duration between said divisional answer messages successively before transmitting said divisional answer messages so that said communication blank duration on said communication line between said divisional answer messages is a second predetermined length of time which is less than said first predetermined length of time, and then transmits said divisional answer messages.

11. A slave device for use in a communication system wherein said slave device is connected to a master device by a communication line, said slave device comprising:

means for, upon receipt by said slave device via said communication line of a request message from said master device requesting that a predetermined process be performed, transmitting an answer message for said request message to said communication line; and dividing means for, if said slave device has an answer message having more data than a predetermined amount to transmit, dividing said answer message into divisional answer messages and setting a communication blank duration between said divisional answer messages successively before transmitting said divisional answer messages so that said communication blank duration on said communication line between said divisional answer messages is shorter than communication blank duration on said communication line after said slave device completes transmitting an answer message until said master device starts transmitting a request message and then transmitting said divisional answer messages.

12. A method of communicating in a communication system, said method comprising the step of:

monitoring, in a first slave device, a communication line for messages from other slave devices;

measuring, in said first slave device, a first elapsed time during which there are no messages on said communication line, beginning with a termination of transmission of a message from one of said other slave devices;

sending, from said first slave device, a first portion of a first message to be sent on said communication line when said first elapsed time reaches a first predetermined length of time associated with said first slave device; and if said first message to be sent is longer than a predetermined message length, setting at least one additional portion of said first message to be sent a second predetermined length of time associated with said first slave device after termination of transmission of said first portion of said first message to be sent, and then sending from said first slave device said first message to be sent on said communication line.

13. The method of claim 12, wherein said first predetermined length of time associated with said first slave device is greater than said second predetermined length of time associated with said first slave device.

14. The method of claim 12, wherein said one of said other slave devices has a higher communication priority than said first slave device.

15. The method of claim 12, further comprising the steps of:

monitoring, in a second slave device, said communication line for messages from other slave devices;

measuring, in said second slave device, a second elapsed time during which there are no messages on said communication line, beginning with a termination of transmission of a message from one of said other slave devices;

sending, from said second slave device, a first portion of a second message to be sent on said communication line when said second elapsed time reaches a first predetermined length of time associated with said second slave device; and if said second message to be sent is longer than a predetermined message length, sending, from said second slave device, at least one additional portion of said second message to be sent a second predetermined length of time associated with said second slave device after termination of transmission of said first portion of said second message to be sent.

16. The method of claim 15, wherein said first periods of time associated with said first and second slave devices are longer than said second periods of time associated with said first and second slave devices, respectively.

17. The method of claim 15, wherein said first period of time associated with said first slave device is shorter than said first period of time associated with said second slave device, said first slave device having a higher communication priority than said second slave device.

18. The method of claim 15, wherein said first period of time associated with said first slave device is longer than said first period of time associated with said second slave device, said first slave device having a lower communication priority than said second slave device.

19. A communication system comprising:

a communication line;

a master device for transmitting via said communication line a request message to request that a predetermined processing be performed;

a plurality of slave devices, connected to said master device by said communication line, for, responsive to receipt of said request message via said communication line, transmitting via said communication line answer messages which are in an order corresponding to descending priorities of said slave devices;

said master device including connection confirming message transmitting means for transmitting a connection confirming message to confirm which of said slave devices is able to transmit an answer message via said communication line;

each of said slave devices including first answer message transmitting means for, in response to a connection confirming message from said communication line, transmitting a first answer message that includes an identification value of said control device to said communication line, identification value storing means for sequentially storing said identification value included in said answer message transmitted by said first answer message transmitting means, and priority setting means for determining current priorities based on said identification value stored in said identification storing means; and said master device transmits a request message, and said slave devices receive said request message and transmit answer messages, based on current priorities determined by said priority setting means.

20. The communication system of claim 19, wherein:

each of said slave devices further includes identification writing means for, when a given one of said slave devices receives an answer message transmitted by one of said slave devices having a higher priority than said given one of said slave devices via said communication line, writing said identification value included in that answer message into said identification value storing means of said given one of said slave devices;

transmission timing determining means for, when said slave device receives a request message from said master device through said communication line, determining whether a turn for said slave device to transmit an answer message in response to that request message will come next, based on said identification value written into said identification value storing means, and second answer message transmitting means for, when said transmission timing determining means determines that said turn for said slave device to transmit an answer message in response to that request message will come next, transmitting that answer message to said communication line.

21. The communication system of claim 19, wherein:

said transmission timing determining means determines whether said turn for said slave device to transmit an answer message in response to that request message will come next, by determining whether said slave device has received an answer message from a slave device having a lowest priority among slave devices whose identification values have been written in said identification value storing means of said slave device.

22. The communication system of claim 19, wherein:

said identification value storing means is provided in said master device; and said priority setting means includes identification value writing means for, when said master device receives an answer message transmitted by said first answer message transmitting means of any one of said slave devices via said communication line, writing an identification value included in that answer message into said identification value storing means; and first predetermined time setting means for determining said first predetermined length of time for a slave device corresponding to said identification value written in said identification value storing means in such a manner that said first predetermined length of time respectively determined for said slave devices becomes less in an order of ascending priorities of said slave devices.

23. The communication system of claim 19, wherein said second answer message transmitting means is further for adding data to an end of answer message, said data indicating that said answer message is a last message.

* * * * *